(12) United States Patent
Kim et al.

(10) Patent No.: US 11,165,235 B2
(45) Date of Patent: Nov. 2, 2021

(54) BRACKET-EQUIPPED CONDUCTIVE PATH

(71) Applicant: Sumitomo Wiring Systems, Ltd., Mie (JP)

(72) Inventors: Kyungwoo Kim, Mie (JP); Toshinari Kobayashi, Mie (JP); Hironobu Yamamoto, Mie (JP); Koichi Kato, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 16/610,242

(22) PCT Filed: Nov. 26, 2018

(86) PCT No.: PCT/JP2018/043309
§ 371 (c)(1),
(2) Date: Nov. 1, 2019

(87) PCT Pub. No.: WO2019/107291
PCT Pub. Date: Jun. 6, 2019

(65) Prior Publication Data
US 2020/0059077 A1 Feb. 20, 2020

(30) Foreign Application Priority Data

Nov. 29, 2017 (JP) .............................. JP2017-228697

(51) Int. Cl.
*H02G 3/30* (2006.01)
*H01B 7/00* (2006.01)
(Continued)

(52) U.S. Cl.
CPC .............. *H02G 3/30* (2013.01); *H01B 7/0045* (2013.01); *H02G 3/0481* (2013.01); *B60R 16/0215* (2013.01)

(58) Field of Classification Search
CPC .......... H02G 3/32; H02G 3/0406; H02G 3/30; H02G 3/0481; H02G 3/0462;
(Continued)

(56) References Cited

U.S. PATENT DOCUMENTS 6,856,057 B2 * 2/2005 Kobayashi ............. H02K 3/522
310/254.1
9,029,699 B2 * 5/2015 Kato ................... H01R 13/5208
174/72 A
(Continued)

FOREIGN PATENT DOCUMENTS

JP 2007-185077 A 7/2007
JP 2016-144279 A 8/2016

OTHER PUBLICATIONS

International Search Report, Application No. PCT/JP2018/043309 dated Dec. 18, 2018. ISA/Japan Patent Office.

*Primary Examiner* — Roshn K Varghese
(74) *Attorney, Agent, or Firm* — Honigman LLP

(57) ABSTRACT

An object is to suppress concentration of stress on electrical wires when the electrical wires are bent in the vicinity of a bracket. A bracket-equipped conductive path includes a conductive path main body that is constituted by a plurality of coated wires, a protector that surrounds the conductive path main body, and a bracket that is made of metal and includes a base portion that is embedded in the protector in such a manner that detachment of the base portion from the protector is restricted and an attachment portion that extends from the base portion. The base portion has a flat plate shape and is arranged to face the conductive path main body in a direction that is substantially parallel to a thickness direction of the base portion.

6 Claims, 23 Drawing Sheets

(51) Int. Cl.
*H02G 3/04* (2006.01)
*B60R 16/02* (2006.01)

(58) Field of Classification Search
CPC ............... H02G 3/0683; H02G 3/0468; B60R
16/0215; B60R 16/02; H01B 7/282;
H01B 7/2825; H01B 7/0045; H01B 7/58;
H01B 7/368; F16L 3/12; F16L 3/22;
F16L 3/08; F16L 3/085; H01R 4/646
USPC ................ 174/135, 72 R, 663; 248/74.3
See application file for complete search history.

(56) References Cited

U.S. PATENT DOCUMENTS

| | | | |
|---|---|---|---|
| 2002/0019165 A1 | 2/2002 | Aoki et al. | |
| 2010/0062620 A1* | 3/2010 | Lei .................... | H01R 13/2442 |
| | | | 439/66 |
| 2012/0222296 A1* | 9/2012 | Miyamoto ............ | E05F 15/443 |
| | | | 29/825 |
| 2015/0107894 A1* | 4/2015 | Hayashi .............. | B60R 16/0222 |
| | | | 174/72 A |
| 2017/0313265 A1 | 11/2017 | Shimizu et al. | |
| 2018/0072248 A1* | 3/2018 | Ohashi ................ | B60R 16/0215 |
| 2018/0218807 A1* | 8/2018 | Takahashi .......... | H02G 15/1806 |

* cited by examiner

BRACKET-EQUIPPED CONDUCTIVE PATH

CROSS-REFERENCE TO RELATED APPLICATIONS

This application is the U.S. national stage of PCT/JP2018/043309 filed Nov. 26, 2018, which claims priority of Japanese Patent Application No. JP 2017-228697 filed Nov. 29, 2017, the contents of which are incorporated herein.

TECHNICAL FIELD

The present disclosure relates to a bracket-equipped conductive path.

BACKGROUND

A plurality of electrical devices are arranged at a plurality of locations in an automobile, and a plurality of electrical wires that are connected to the plurality of electrical devices are made into a bundle midway on a wiring route to constitute a wire harness. JP 2002-058151A discloses one example of a wire harness that is arranged such that a plurality of electrical wires branch off midway as described above. As a means for attaching such a wire harness to a vehicle body, a bracket that is made of metal can be used. In this case, the wire harness can be arranged correctly along an intended route by attaching brackets to a portion of the wire harness where an electrical wire branches off and a portion of the wire harness where electrical wires are bent.

As a means for fixing a metal bracket to a wire harness, consideration can be given to a method of covering an outer circumferential surface of the wire harness with a tubular portion that is formed in the bracket and performing caulking to reduce the diameter of the tubular portion. However, if a wire harness is surrounded by a tubular portion that is made of metal, there is a concern that, when electrical wires are bent in the vicinity of the bracket, the curvature of the electrical wires at an end portion of the tubular portion will increase and stress will concentrate on core wires of the electrical wires. Also, there is a concern that stress will concentrate on the core wires of the electrical wires as a result of the core wires being crushed in the radial direction under the force applied in caulking of the tubular portion.

The present disclosure was completed based on the above circumstances, and an object of the present disclosure is to suppress concentration of stress on electrical wires.

SUMMARY

The present disclosure is characterized in including a conductive path main body that is constituted by a plurality of coated wires. A resin molded body surrounds the conductive path main body. A bracket includes a base portion that is embedded in the resin molded body and an attachment portion that is continuous to the base portion, wherein the base portion has a substantially flat plate shape and is arranged to face the conductive path main body in a direction that is substantially parallel to a thickness direction of the base portion.

Advantageous Effects of Disclosure

The base portion of the bracket is embedded in the resin molded body and the bracket is fixed to the conductive path main body via the resin molded body, and therefore concentration of stress on core wires of the coated wires can be prevented. Also, when the coated wires are bent in the vicinity of the bracket, there is no risk that the manner of deformation of the coated wires will be restricted by the base portion, and therefore concentration of stress on the coated wires can be suppressed when the coated wires are bent. Further, the diameter of the resin molded body can be reduced compared to a case in which the base portion faces the conductive path main body in a direction that is orthogonal to the thickness direction of the base portion.

DETAILED DESCRIPTION OF PREFERRED EMBODIMENTS

Figure 1:
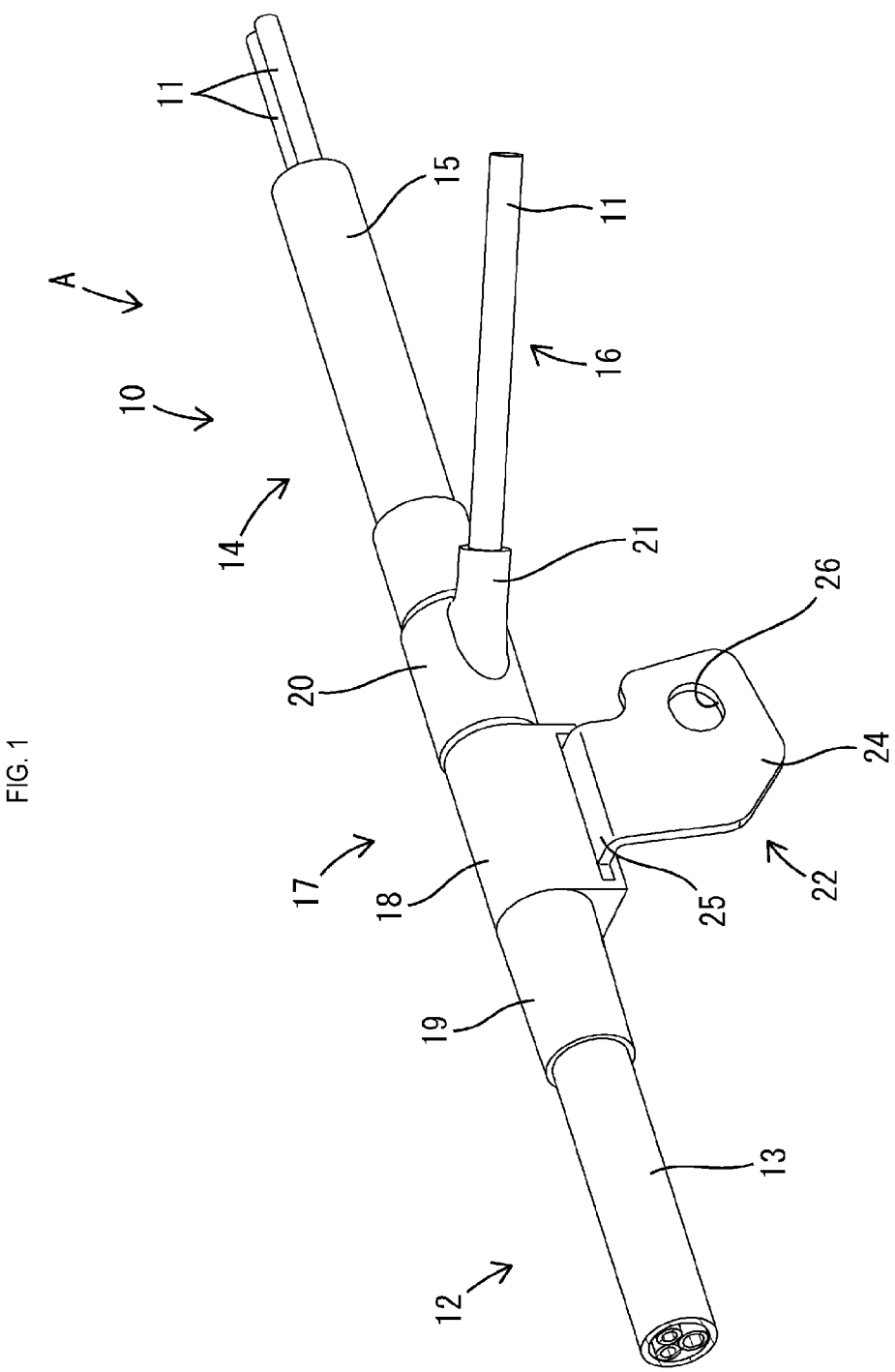
FIG. 1 is a perspective view of a bracket-equipped conductive path according to Embodiment 1.

The present disclosure may have a configuration in which the entire region of the base portion and the entire region of the conductive path main body are not in contact with each other, and the resin molded body is interposed between the base portion and the conductive path main body. According to this configuration, a pressing force is not directly applied from the base portion to the conductive path main body, and therefore stress that might be generated in the conductive path main body can be reduced. Further, the area of contact between the resin molded body and each of the base portion and the conductive path main body is increased, and therefore the fixing strength between the resin molded body and each of the conductive path main body and the bracket is increased.

The present disclosure may have a configuration in which an upright portion that stands to face an outer circumferential surface of the conductive path main body is formed on the base portion. According to this configuration, the area of contact between the bracket and the resin molded body is increased, and therefore the fixing strength between the bracket and the resin molded body is increased.

The present disclosure may have a configuration in which the resin molded body is made of a flexible material and includes an embedding portion in which the base portion is embedded and a protective tube portion that protrudes continuously from the embedding portion in an axial direction of the coated wires. According to this configuration, when the coated wires are bent in the vicinity of the bracket, the protective tube portion is also bent, but the curvature of the bent coated wires can be made small owing to the rigidity of the protective tube portion.

The present disclosure may have a configuration in which a cavity into which the resin molded body enters is formed in the base portion. According to this configuration, relative displacement between the base portion and the resin molded body can be reliably restricted owing to an anchor effect.

The present disclosure may have a configuration in which a through hole into which the resin molded body enters is formed in the base portion. According to this configuration, relative displacement between the base portion and the resin molded body can be reliably restricted owing to an anchor effect.

The present disclosure may have a configuration in which a protrusion protrudes from an outer edge portion of the base portion. The present disclosure may also have a configuration in which the protrusion is flush with the base portion. According to this configuration, relative displacement between the base portion and the resin molded body can be reliably restricted owing to an anchor effect.

The present disclosure may have a configuration in which the protrusion is continuous to the base portion and is flush with the base portion. According to this configuration, the shape of the base portion is simplified.

The present disclosure may have a configuration in which a reinforcing portion is formed in at least one of the base portion and the attachment portion. According to this configuration, the rigidity of the bracket can be increased, and therefore the bracket can be made of a synthetic resin.

The present disclosure may have a configuration in which the conductive path main body is constituted by a trunk line in which the plurality of coated wires are collectively surrounded by a sheath and a plurality of branch lines from which the sheath is removed and that branch off from the trunk line, the resin molded body surrounds, in a liquid-tight manner, a branched region in which the plurality of branch lines branch off from the trunk line, and the base portion is embedded in the resin molded body in the vicinity of the branch lines. According to this configuration, an end portion of the sheath is sealed, in a liquid-tight manner, by the resin molded body in the branched region in which the branch lines branch off from the trunk line, and therefore the intrusion of water into a space between the sheath and the coated wires can be prevented.

Embodiment 1

Figure 2:
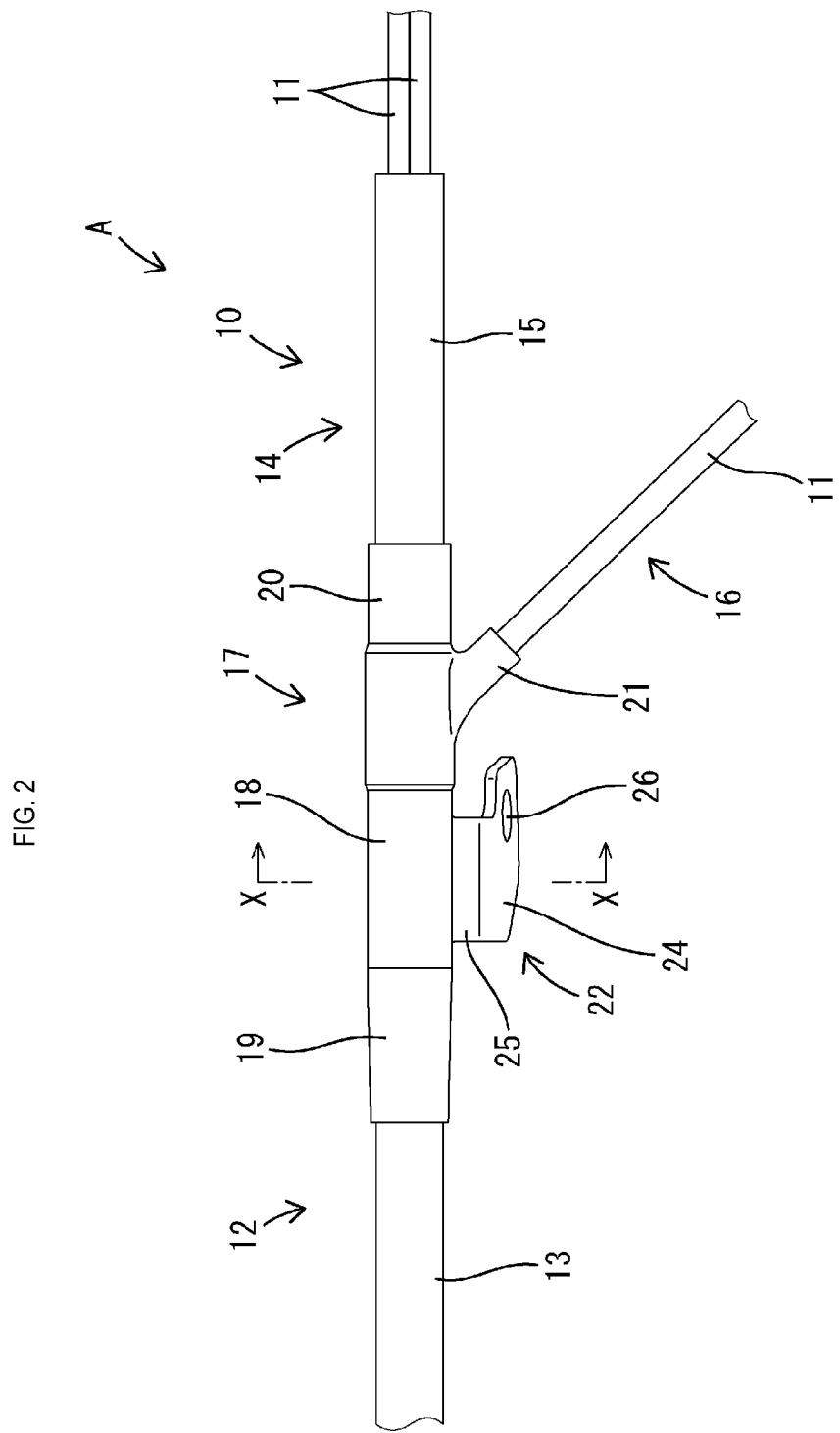
FIG. 2 is a plan view of the bracket-equipped conductive path.
Figure 3:
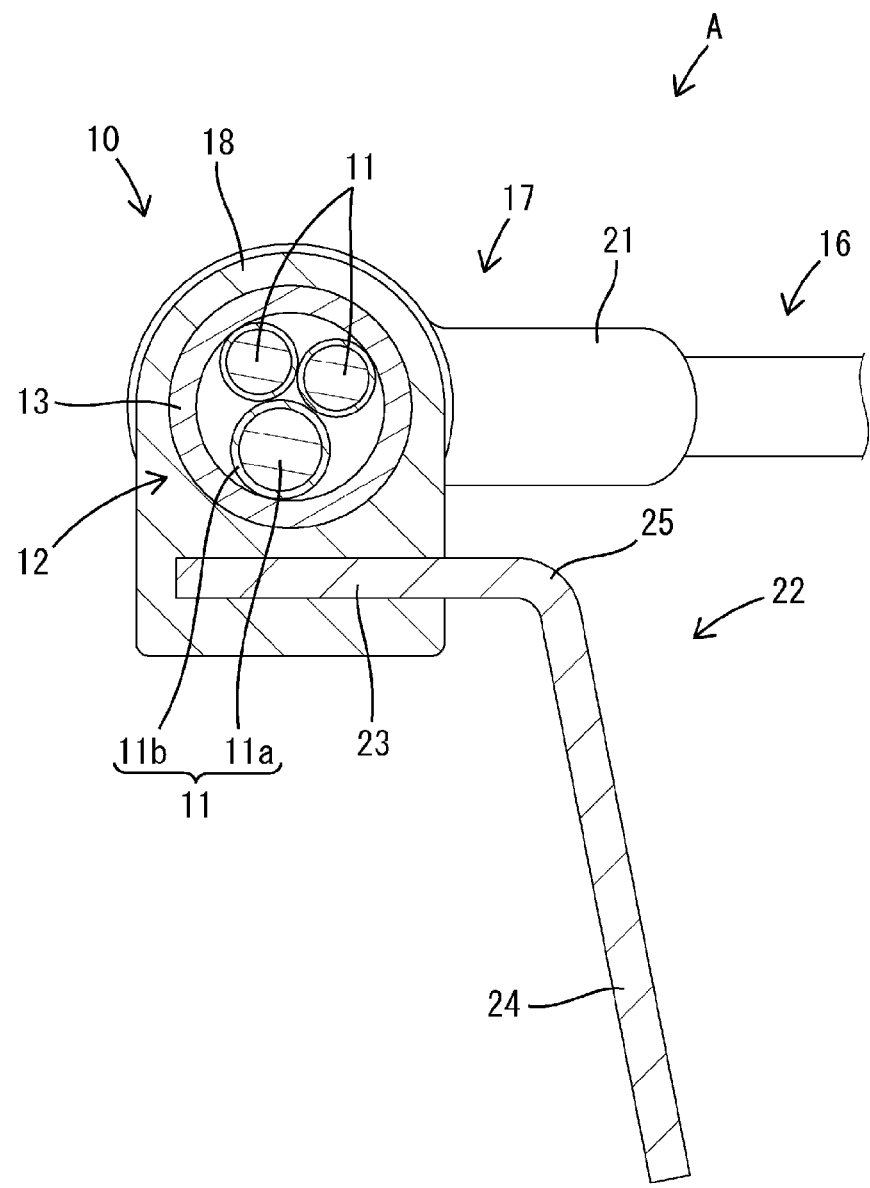
FIG. 3 is a cross-sectional view taken along line X-X in FIG. 2.
Figure 4:
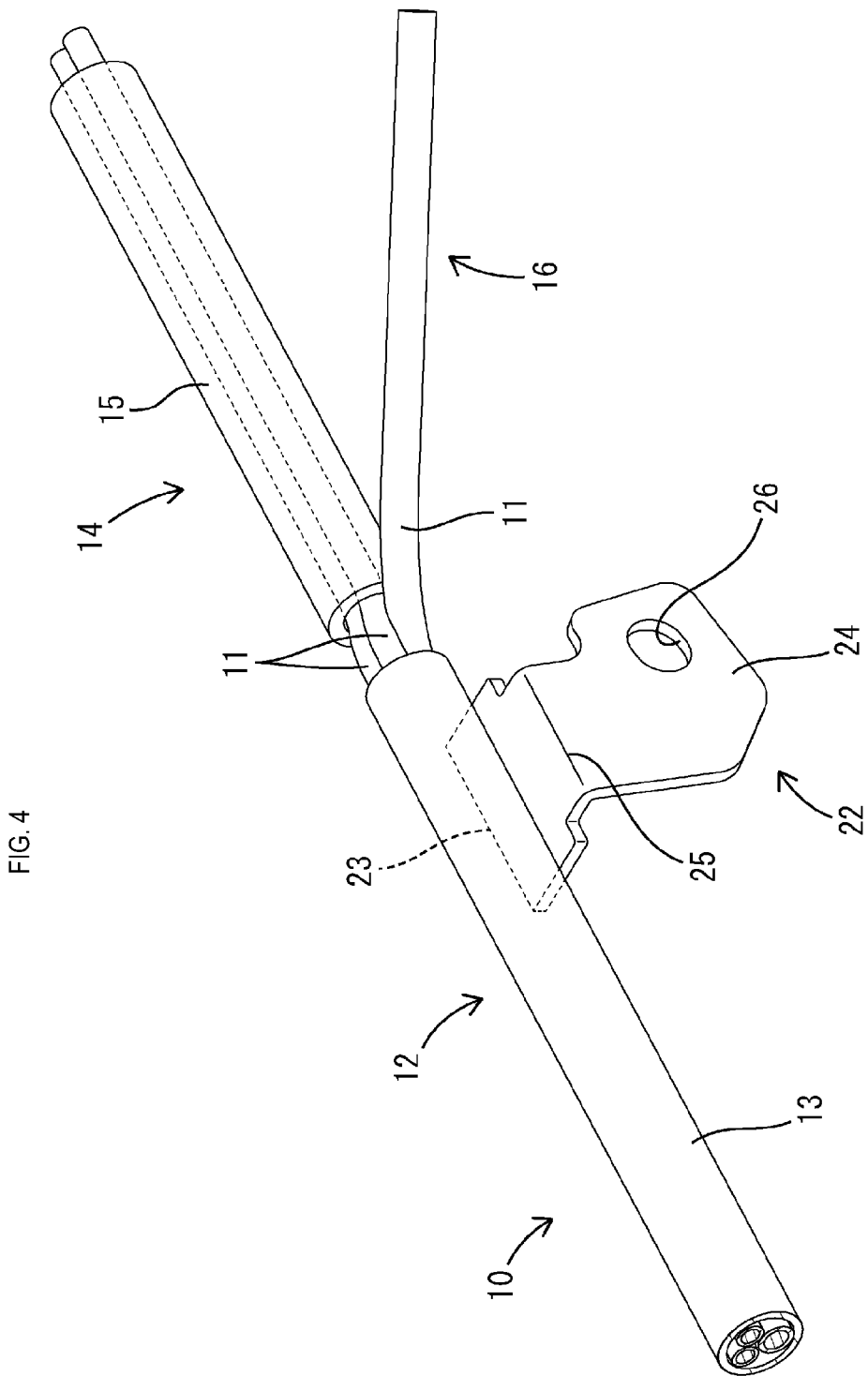
FIG. 4 is a perspective view showing a positional relationship between a conductive path main body and a bracket.
Figure 5:
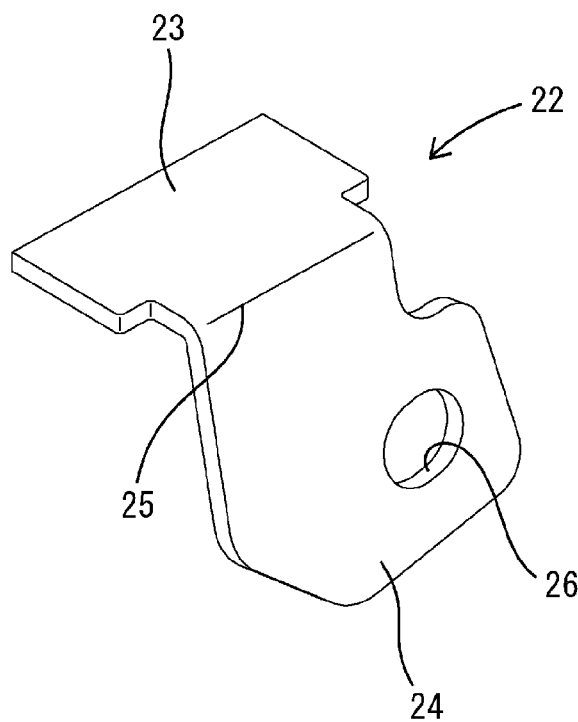
FIG. 5 is a perspective view of the bracket.

The following describes Embodiment 1 as a specific embodiment of the present disclosure with reference to FIGS. 1 to 5. In the following description, the left side in FIG. 2 is defined as the front side in the front-rear direction. The upper side and the lower side in FIGS. 1 and 3 to 5 are respectively defined as the upper side and the lower side in the up-down direction. The left side and the right side in FIG. 3 are respectively defined as the left side and the right side in the left-right direction.

A bracket-equipped conductive path A of Embodiment 1 includes a conductive path main body 10 that is constituted by a plurality of (three in Embodiment 1) coated wires 11, a tubular protector 17 ("a resin molded body" recited in the claims) that is made of a synthetic resin material, and a bracket 22 that is made of metal. Each of the three coated wires 11 constituting the conductive path main body 10 has a well-known configuration in which a flexible core wire 11a that is made of metal is surrounded by an insulating covering 11b that is made of a synthetic resin. The conductive path main body 10 includes a single trunk line 12, a first branch line 14 (one of "branch lines" recited in the claims) and a second branch line 16 (another of "branch lines" recited in the claims) that branch off from the rear end of the trunk line 12 in two directions. The trunk line 12 has a configuration in which the three coated wires 11 are made into a bundle and are collectively surrounded by a sheath 13.

The sheath 13 is removed from regions of the three coated wires 11 that constitute the first branch line 14 and the second branch line 16 (i.e., the regions are exposed from the rear end of the sheath 13). The first branch line 14 is constituted by a bundle of two coated wires 11. The front end portion of the first branch line 14 that is close to the rear end of the trunk line 12 is collectively surrounded by a protective tube 15 that is made of a synthetic resin (for example, urethane resin). The front end portion of the first branch line 14 and the rear end portion of the trunk line 12 are continuous to each other and are mostly linear. A single coated wire 11 that constitutes the second branch line 16 is arranged to extend diagonally rearward with respect to the first branch line 14 and the trunk line 12 in plan view.

The protector 17 is made of a synthetic resin material that is flexible or elastic (for example, urethane resin). The protector 17 covers a branched region in which the branch lines 14 and 16 branch off from the trunk line 12 (i.e., the rear end portion of the trunk line 12, the front end portion of the protective tube 15 surrounding the first branch line 14, and the front end portion of the second branch line 16) in a state of being in liquid-tight contact with the branched region. The protector 17 has a tubular shape as a whole, and the rear end portion of the protector 17 has a tubular shape that is branched into two portions, that is, a portion for the first branch line 14 and a portion for the second branch line 16. Although the two coated wires 11 are exposed between the rear end of the sheath 13 and the protective tube 15, exposed portions of these coated wires are also surrounded by the protector 17.

The protector 17 is a single-piece component that includes an embedding portion 18, a first protective tube portion 19 ("a protective tube portion" recited in the claims), a second protective tube portion 20 ("a protective tube portion" recited in the claims), and a third protective tube portion 21 ("a protective tube portion" recited in the claims). The embedding portion 18 surrounds the entire circumference of the rear end portion of the trunk line 12 of the conductive path main body 10. The first protective tube portion 19 has a cylindrical shape, extends forward from the front end of the embedding portion 18, and surrounds the sheath 13. The second protective tube portion 20 surrounds the rear end portion of the sheath 13, the exposed portions of the coated wires 11 (first branch line 14) between the rear end of the sheath 13 and the front end of the protective tube 15, and the front end portion of the protective tube 15. The third protective tube portion 21 extends diagonally rearward from an outer circumferential surface of the second protective tube portion 20 and surrounds the front end portion of the second branch line 16 (coated wire 11).

The bracket 22 is a single-piece component that is formed by bending a metal plate member that has a predetermined shape. The bracket 22 includes a base portion 23 that has a flat plate shape and is oriented such that its plate surfaces extend in the horizontal direction, an attachment portion 24 that has a flat plate shape and is oriented such that its plate surfaces extend in the vertical direction, and a connecting portion 25 that has a bent shape and connects a right side edge portion of the base portion 23 and an upper edge of the attachment portion 24.

The thickness direction of the base portion 23 is oriented in the up-down direction (a direction orthogonal to axes of the first protective tube portion 19 and the second protective tube portion 20), and the base portion 23 is embedded in the embedding portion 18 in such a manner that detachment of the base portion from the embedding portion is restricted. The base portion 23 is embedded in the embedding portion 18 through insert molding in which the bracket 22, which is set in a mold (not shown), and the protector 17 are formed into a single piece in a process of molding the protector 17. The base portion 23 is arranged below the trunk line 12.

As shown in FIG. 3, in a cross section that is orthogonal to the axis of the conductive path main body 10, the base portion 23 is arranged to face the conductive path main body 10 in a direction that is parallel to the thickness direction of the base portion 23 (the up-down direction in FIG. 3). In other words, the conductive path main body 10 and the base portion 23 face each other in a direction (the up-down direction) that is perpendicular to both surfaces (upper and lower surfaces) of the base portion 23 that are parallel to the extension direction of the base portion 23. The base portion 23 is arranged just below the conductive path main body 10 that is oriented such that its axis extends in the front-rear direction (the horizontal direction), and an upper surface of the base portion 23 and an outer circumferential surface of the conductive path main body 10 face each other in the up-down direction. That is, the surface (the upper surface) of the base portion 23 that faces the conductive path main body 10 is a flat surface that is perpendicular to the thickness direction of the base portion 23.

In the same cross section that is orthogonal to the axis of the conductive path main body 10, the entirety of the conductive path main body 10 is arranged within the range in which the base portion 23 is formed, in the horizontal direction (the left-right direction in FIG. 3) parallel to the surface (the upper surface) of the base portion 23 facing the conductive path main body 10. According to this configuration, the protector 17 can be made smaller in the up-down direction compared to a case in which the base portion 23 is arranged to extend in a radial direction with respect to the conductive path main body 10 (for example, the base portion 23 is oriented vertically just below the conductive path main body 10) and the conductive path main body 10 and the base portion 23 face each other in a direction that is perpendicular to the thickness direction of the base portion 23.

The entire region of the upper surface of the base portion 23 and the entire region of the outer circumferential surface of the conductive path main body 10 (the sheath 13) are positioned to not be in contact with each other. The synthetic resin material of the protector 17 enters a space between the upper surface of the base portion 23 and a lower end portion of the outer circumferential surface of the conductive path main body 10. According to this configuration, a pressing force is not directly applied from the base portion 23 to the conductive path main body 10, and therefore stress that might be generated in the conductive path main body 10 can be reduced. Further, the area of contact between the protector 17 and each of the base portion 23 and the conductive path main body 10 is increased, and therefore the fixing strength between the protector 17 and each of the conductive path main body 10 and the bracket 22 is increased.

The attachment portion 24 extends downward from the base portion 23. The thickness direction of the attachment portion 24 is oriented in the left-right direction (a direction orthogonal to the axes of the first protective tube portion 19 and the second protective tube portion 20). A circular attachment hole 26 is formed in the attachment portion 24, extending through the attachment portion in its thickness direction. The bracket 22 is configured to be fixed to the body of an automobile (not shown) by inserting a fastening member (not shown) such as a bolt into the attachment hole 26. When the bracket 22 is fixed to the body, a branched portion of the conductive path main body 10 in which the branch lines 14 and 16 branch off from the trunk line 12 is positioned relative to the body, and the conductive path main body 10 can be arranged along the predetermined route.

The bracket-equipped conductive path A according to Embodiment 1 includes the conductive path main body 10 that is constituted by a bundle of the coated wires 11, the tubular protector 17 that is made of a synthetic resin material and surrounds the conductive path main body 10, and the bracket 22 that is made of metal. The bracket 22 includes the plate-shaped base portion 23 that is embedded in the protector 17 in such a manner that detachment of the base portion from the protector is restricted and the attachment portion 24 that is continuous to the base portion 23 via the connecting portion 25.

As a means for attaching the bracket 22 to the conductive path main body 10, the base portion 23 of the bracket 22 is embedded in the resin protector 17 to fix the bracket 22 to the conductive path main body 10 via the protector 17, and therefore there is no risk that stress generated through fastening of the bracket 22 will concentrate on the core wires 11a of the coated wires 11. Further, the base portion 23 that serves as a means for fixing the bracket 22 to the conductive path main body 10 has the plate shape rather than a tubular shape that surrounds the conductive path main body 10. Therefore, when the coated wires 11 are bent in the vicinity of the bracket 22, there is no risk that the manner of deformation of the coated wires 11 will be restricted by the base portion 23, and accordingly concentration of stress on the coated wires 11 can be suppressed.

Further, the protector 17 is made of a flexible synthetic resin material and includes the embedding portion 18 in which the base portion 23 is embedded and the first protective tube portion 19, the second protective tube portion 20, and the third protective tube portion 21 that protrude continuously from the embedding portion 18 in the axial direction of the coated wires 11. According to this configuration, when the coated wires 11 are bent in the vicinity of the bracket 22, the protective tube portions 19, 20, and 21 are also bent, but the curvature of the bent coated wires 11 can be made small owing to the rigidity of the protective tube portions 19, 20, and 21. Furthermore, the synthetic resin material of the protector 17 is interposed between the base portion 23 and the outer circumferential surface of the conductive path main body 10, and therefore relative displacement between the base portion 23 and the protector 17 can be restricted.

Further, the conductive path main body 10 is constituted by the trunk line 12 in which the plurality of coated wires 11 are collectively surrounded by the sheath 13 and the plurality of branch lines 14 and 16 from which the sheath 13 is removed and that branch off from the trunk line. The protector 17 surrounds, in a liquid-tight manner, the branched region in which the plurality of branch lines 14 and 16 branch off from the trunk line 12, and the base portion 23 is embedded in the protector 17 in the vicinity of the branch lines 14 and 16 (i.e., a region in which the trunk line 12 is arranged). According to this configuration, an end portion of the sheath 13 is sealed, in a liquid-tight manner, by the protector 17 in the branched region in which the branch lines 14 and 16 branch off from the trunk line 12, and therefore the intrusion of water into a space between the sheath 13 and the coated wires 11 can be prevented.

Embodiment 2

Figure 6:
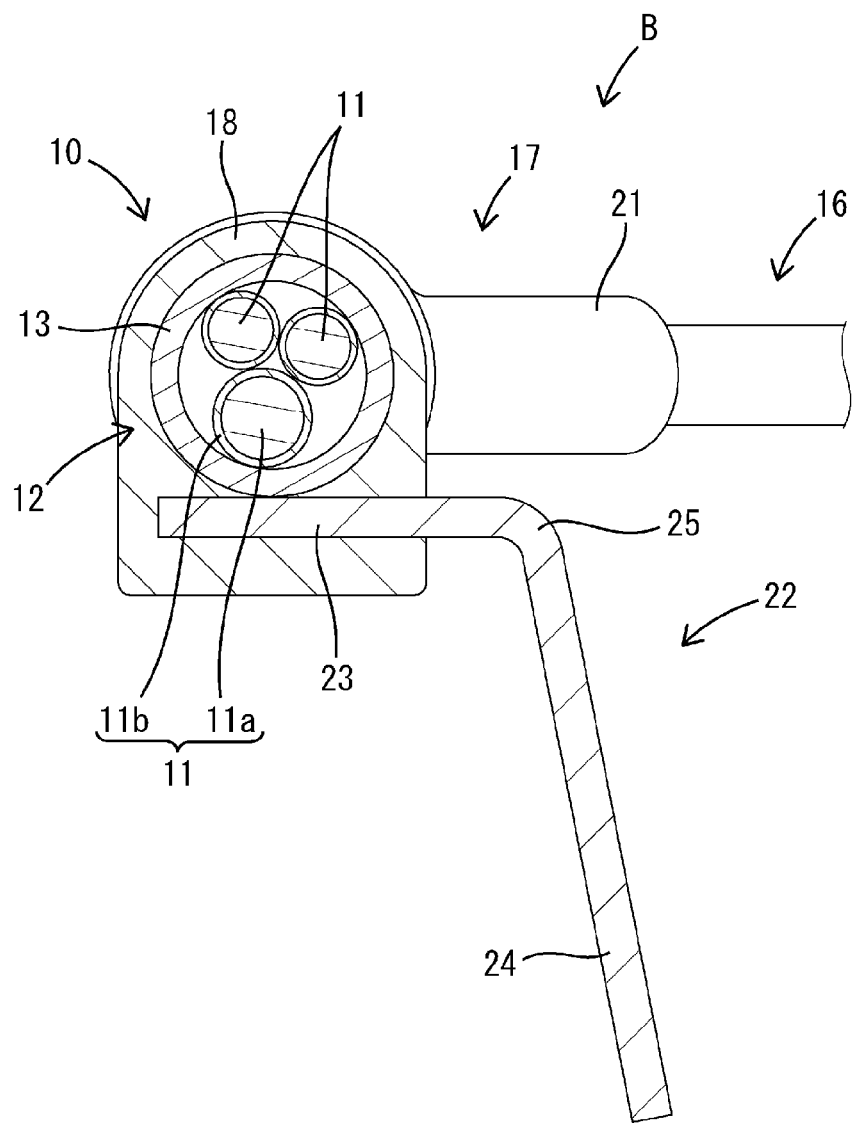
FIG. 6 is a cross-sectional view of a bracket-equipped conductive path according to Embodiment 2.

Next, Embodiment 2 will be described as a specific embodiment of the present disclosure with reference to FIG. 6. In a bracket-equipped conductive path B according to Embodiment 2, the upper surface of the base portion 23 of the metal bracket 22 is in contact with the lower end of the outer surface of the conductive path main body 10. Other configurations are the same as those in the above-described Embodiment 1, and therefore the same configurations are represented by the same reference signs as those used in Embodiment 1 and a description of their structures, functions, and effects is omitted.

Embodiment 3

Figure 7:
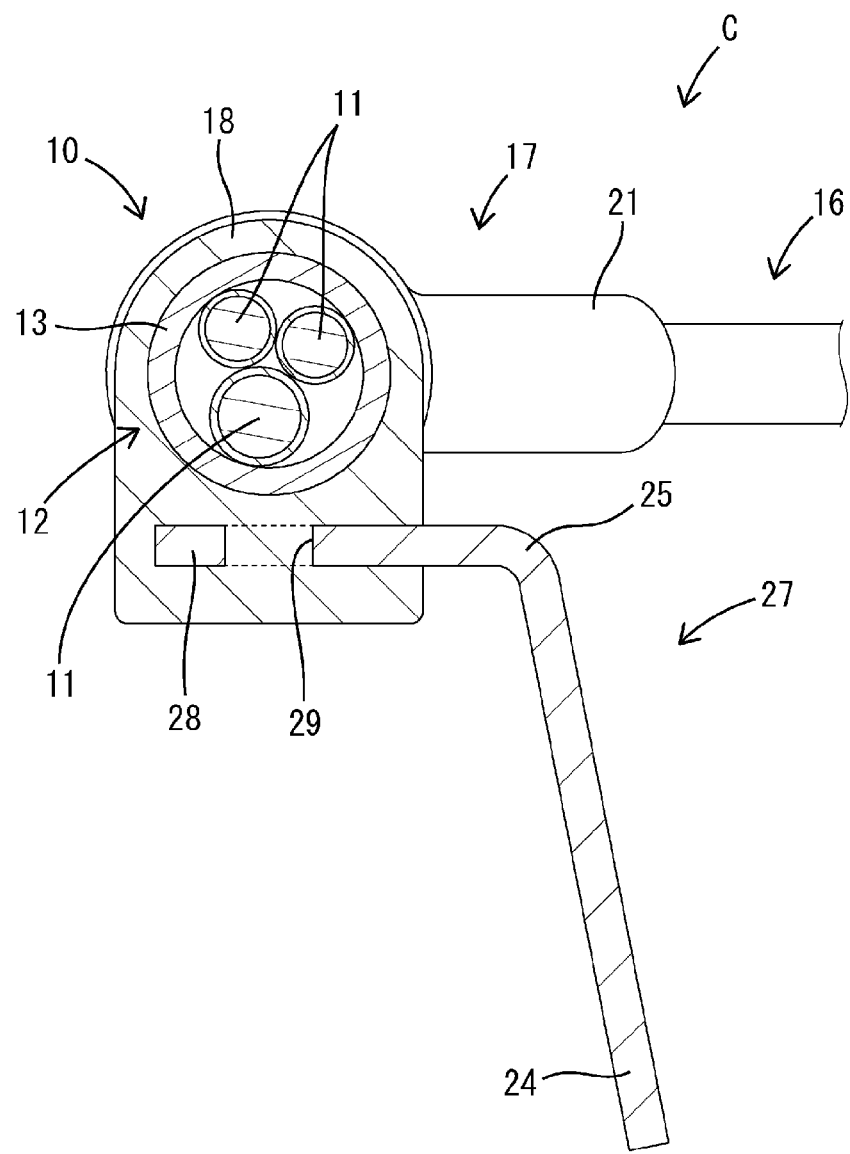
FIG. 7 is a cross-sectional view of a bracket-equipped conductive path according to Embodiment 3.
Figure 8:
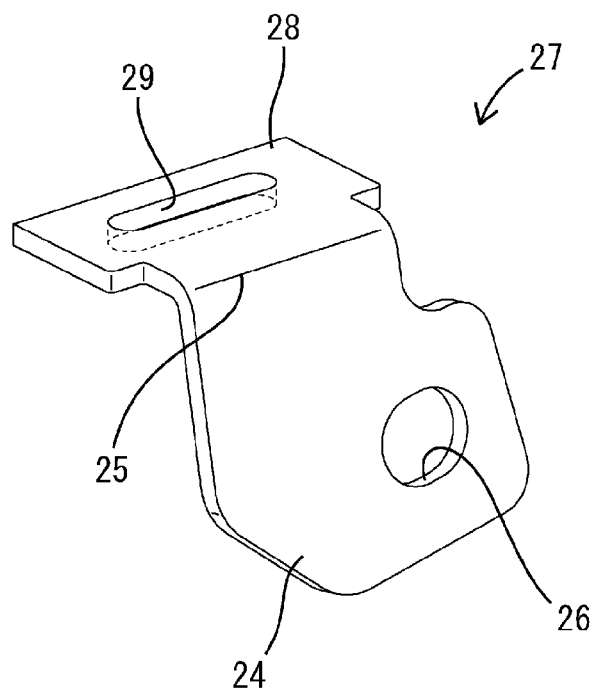
FIG. 8 is a perspective view of a bracket according to Embodiment 3.

Next, Embodiment 3 will be described as a specific embodiment of the present disclosure with reference to FIGS. 7 and 8. In a bracket-equipped conductive path C according to Embodiment 3, a slit-shaped through hole 29 ("a cavity" recited in the claims) into which a portion of the synthetic resin material of the protector 17 ("a resin molded body" recited in the claims) enters is formed in a base portion 28 of a bracket 27 that is made of metal. The through hole 29 extends through the base portion 28. According to this configuration, the synthetic resin material of the protector 17 exhibits an anchor effect, and therefore relative displacement between the base portion 28 and the protector 17 can be reliably restricted.

Further, the entire region of an upper surface of the base portion 28 and the entire region of the outer circumferential surface of the conductive path main body 10 (the sheath 13) are positioned to not be in contact with each other. The synthetic resin material of the protector 17 also enters a space between the upper surface of the base portion 28 and the lower end portion of the outer circumferential surface of the conductive path main body 10. Other configurations are the same as those in the above-described Embodiment 1, and therefore the same configurations are represented by the same reference signs as those used in Embodiment 1 and a description of their structures, functions, and effects is omitted.

Embodiment 4

Figure 9:
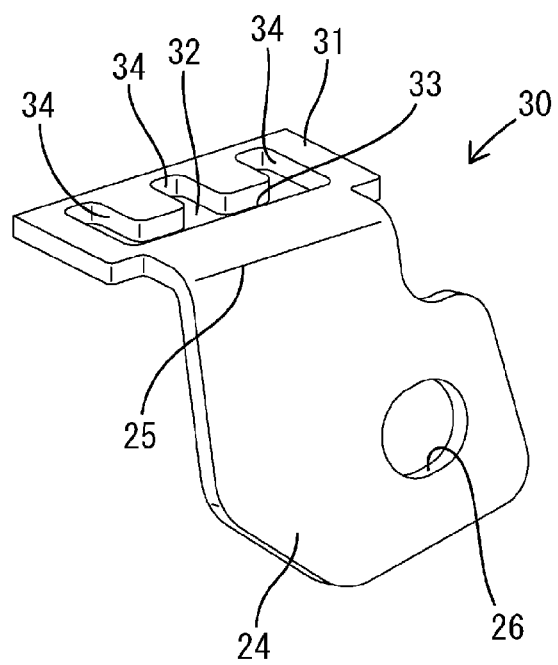
FIG. 9 is a perspective view of a bracket according to Embodiment 4.
Figure 10:
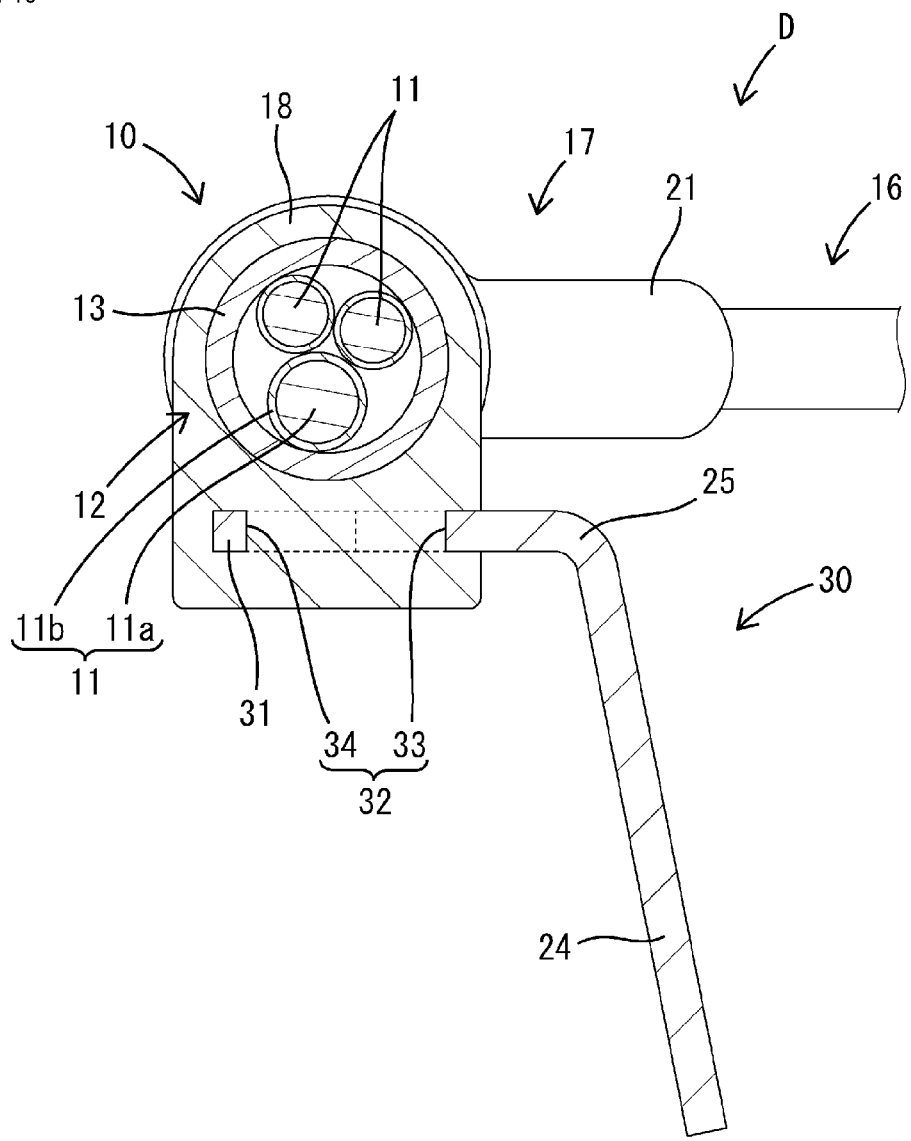
FIG. 10 is a cross-sectional view of a bracket-equipped conductive path according to Embodiment 4.

Next, Embodiment 4 will be described as a specific embodiment of the present disclosure with reference to FIGS. 9 and 10. In a bracket-equipped conductive path D according to Embodiment 4, a through hole 32 ("a cavity" recited in the claims) into which the synthetic resin material of the protector 17 ("a resin molded body" recited in the claims) enters is formed in a base portion 31 of a bracket 30 that is made of metal. The through hole 32 extends through the base portion 31. The through hole 32 is constituted by a first slit 33 that extends in the front-rear direction and a plurality of (three in Embodiment 4) second slits 34 that extend substantially perpendicularly from the first slit 33 to a side. The plurality of second slits 34 are arranged at intervals in the front-rear direction (the length direction of the first slit 33).

According to this configuration, the synthetic resin material of the protector 17 exhibits an anchor effect, and therefore relative displacement between the base portion 31 and the protector 17 can be reliably restricted. Further, the entire region of an upper surface of the base portion 31 and the entire region of the outer circumferential surface of the conductive path main body 10 (the sheath 13) are positioned to not be in contact with each other. The synthetic resin material of the protector 17 also enters a space between the upper surface of the base portion 31 and the lower end of the outer surface of the sheath 13 of the conductive path main body 10. Other configurations are the same as those in the above-described Embodiment 1, and therefore the same configurations are represented by the same reference signs as those used in Embodiment 1 and a description of their structures, functions, and effects is omitted.

Embodiment 5

Figure 11:
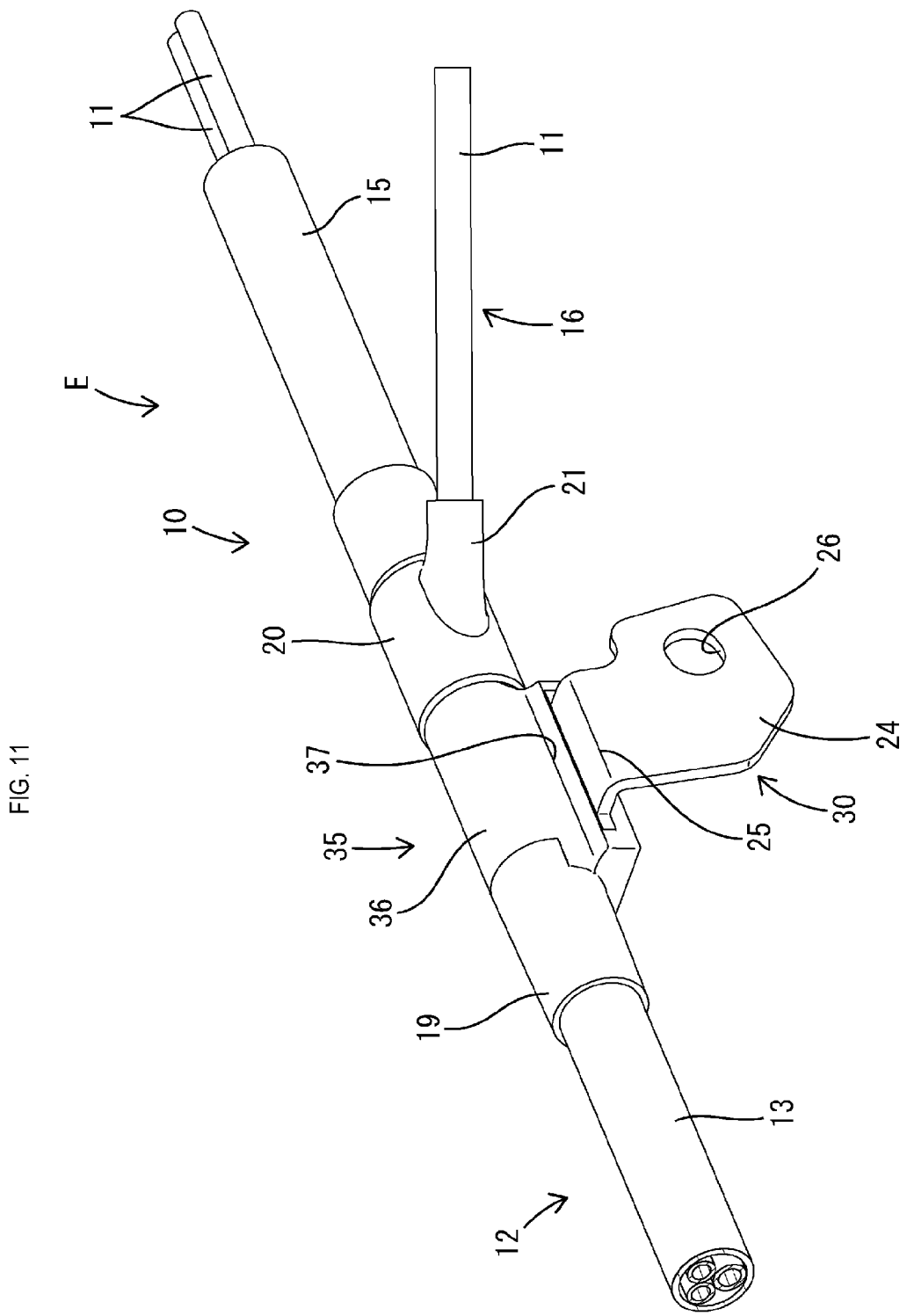
FIG. 11 is a perspective view of a bracket-equipped conductive path according to Embodiment 5.
Figure 12:
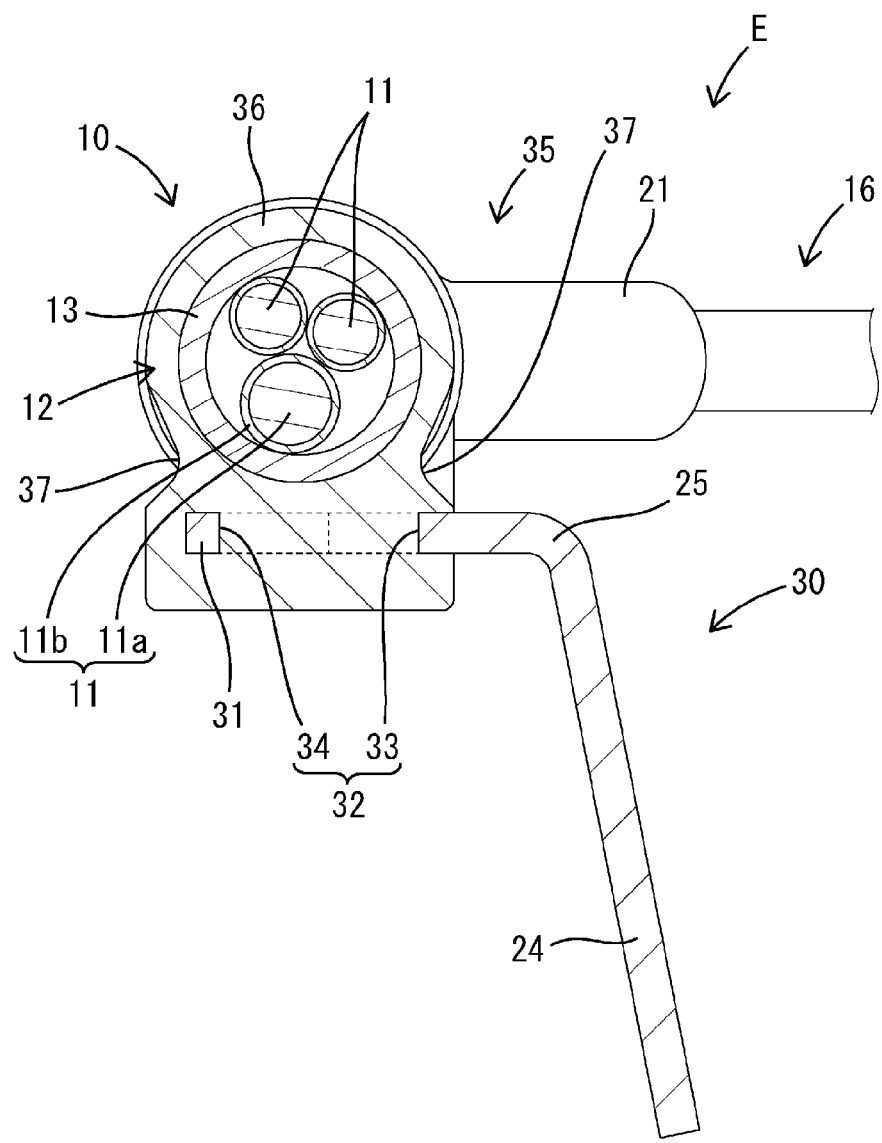
FIG. 12 is a cross-sectional view of the bracket-equipped conductive path according to Embodiment 5.

Next, Embodiment 5 will be described as a specific embodiment of the present disclosure with reference to FIGS. 11 and 12. A bracket-equipped conductive path E according to Embodiment 5 is obtained by forming a pair of left and right groove portions 37 in an embedding portion 36 of a protector 35 ("a resin molded body" recited in the claims) in Embodiment 4. Owing to the formation of the groove portions 37, an upper end-side region of the embedding portion 36 through which the conductive path main body 10 passes and a lower end-side portion of the embedding portion 36 in which the base portion 31 of the bracket 30 is embedded can be displaced relative to each other in the left-right direction. Therefore, the conductive path main body 10 can be displaced relative to the bracket 30 and the body (not shown) in the left-right direction. Other configurations are the same as those in the above-described Embodiment 4, and therefore the same configurations are represented by the same reference signs as those used in Embodiment 4 and a description of their structures, functions, and effects is omitted.

Embodiment 6

Figure 13:
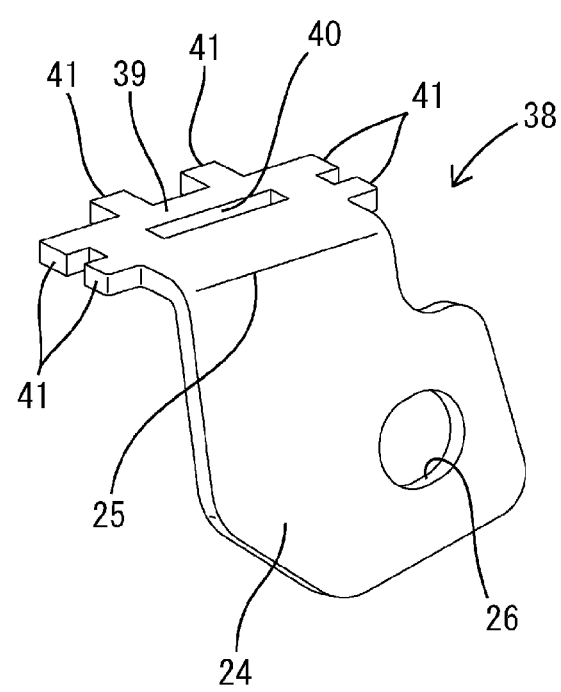
FIG. 13 is a perspective view of a bracket according to Embodiment 6.

Next, Embodiment 6 will be described as a specific embodiment of the present disclosure with reference to FIG. 13. A bracket 38 of Embodiment 6 is made of a metal material, includes a slit-shaped through hole 40 ("a cavity" recited in the claims) that is similar to that in Embodiment 3 and extends through a base portion 39, and further includes a plurality of protrusions 41 that are formed on an outer peripheral edge portion of the base portion 39. The plurality of protrusions 41 are continuous to the base portion 39 and are flush with the base portion 39. A portion of the synthetic resin material of the protector 17 ("a resin molded body" recited in the claims) enters the through hole 40 and also enters spaces between the protrusions 41, and therefore relative displacement between the base portion 39 and the protector 17 can be reliably restricted. Other configurations are the same as those in the above-described Embodiment 3, and therefore the same configurations are represented by the same reference signs as those used in Embodiment 3 and a description of their structures, functions, and effects is omitted.

Embodiment 7

Figure 14:
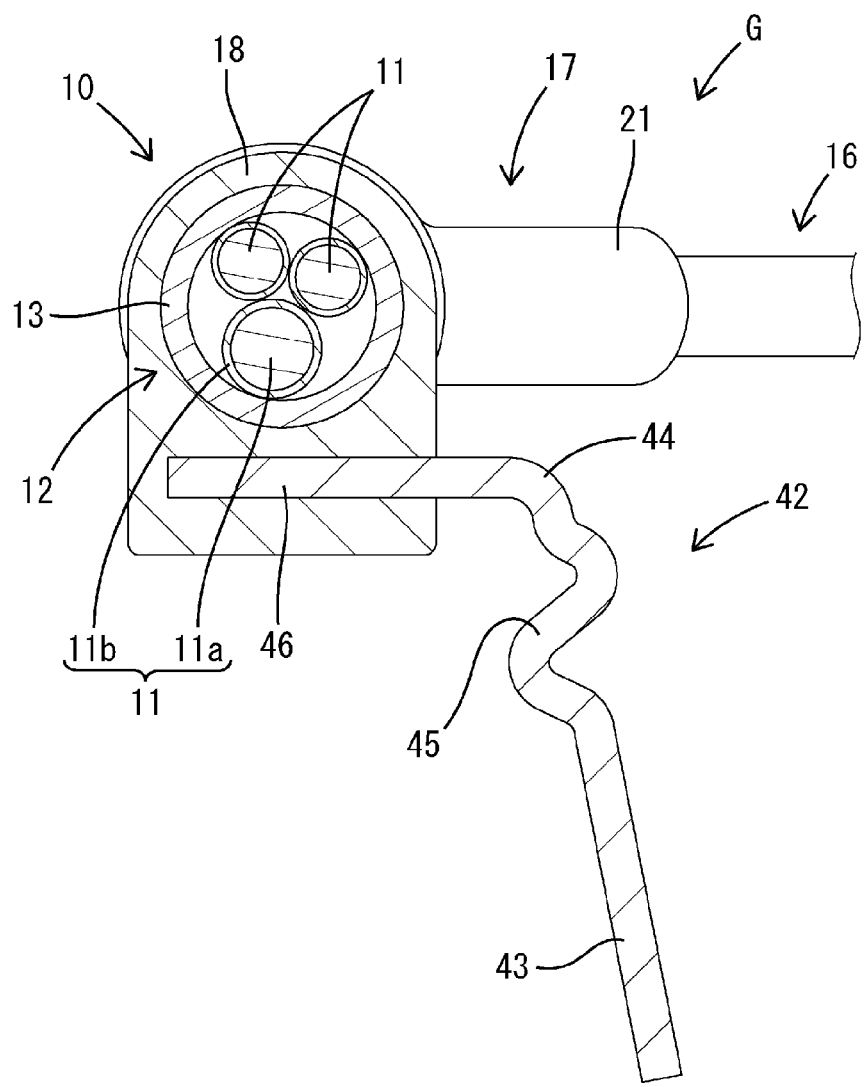
FIG. 14 is a cross-sectional view of a bracket-equipped conductive path according to Embodiment 7.

Next, Embodiment 7 will be described as a specific embodiment of the present disclosure with reference to FIG. 14. A bracket-equipped conductive path G according to Embodiment 7 includes a bracket 42 that is configured differently from that of the above-described Embodiment 1. The bracket of Embodiment 7 is made of a metal material and includes a cushioning portion 45 that is interposed between an upper end portion of an attachment portion 43 and a connecting portion 44. The cushioning portion 45 is elastically deformable and accordingly exhibits a function of allowing for relative displacement between a base portion 46 and the attachment portion 43. Therefore, the conductive path main body 10 can be displaced relative to the bracket 42 in the up-down direction and the left-right direction. Other configurations are the same as those in the above-described Embodiment 1, and therefore the same configurations are represented by the same reference signs as those used in Embodiment 1 and a description of their structures, functions, and effects is omitted.

Embodiment 8

Figure 15:
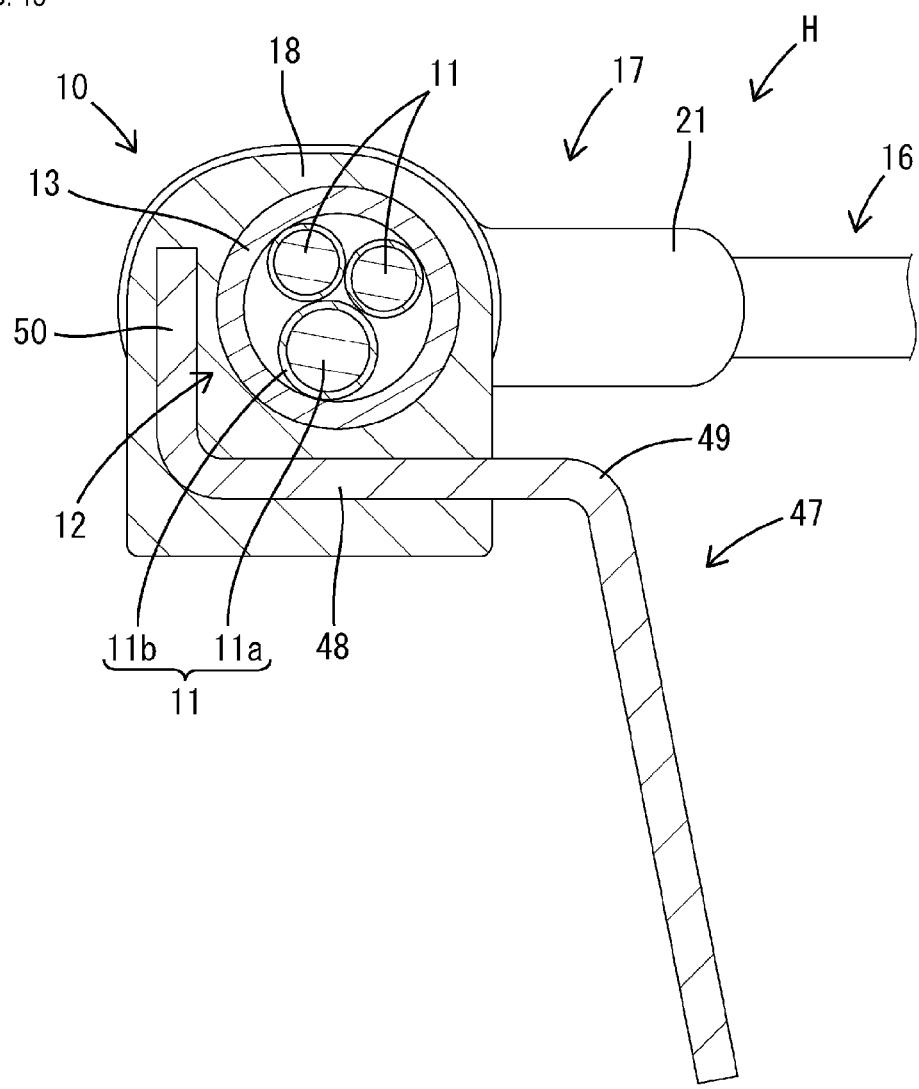
FIG. 15 is a cross-sectional view of a bracket-equipped conductive path according to Embodiment 8.

Next, Embodiment 8 will be described as a specific embodiment of the present disclosure with reference to FIG. 15. A bracket-equipped conductive path H according to Embodiment 8 includes a bracket 47 that is configured differently from that of the above-described Embodiment 1. The bracket 47 of Embodiment 8 is made of a metal material and includes an upright portion 50 that extends from a left edge of a flat plate-shaped base portion 48 (i.e., an edge of an extension from a connecting portion 49), upward (substantially perpendicularly to the base portion 48) in a cantilever manner. The upright portion 50 is embedded in the embedding portion 18 of the protector 17 ("a resin molded body" recited in the claims) and faces a left side portion of the outer surface of the conductive path main body 10.

The entire region of an upper surface of the base portion 48 and the entire region of the outer circumferential surface of the conductive path main body 10 (the sheath 13) are positioned to not be in contact with each other. The entire region of a side surface of the upright portion 50 and the entire region of the outer circumferential surface of the conductive path main body 10 (the sheath 13) are also positioned to not be in contact with each other. A portion of the synthetic resin material of the protector 17 enters a space between the base portion 48 and the outer circumferential surface of the conductive path main body 10 and a space between the upright portion 50 and the outer circumferential surface of the conductive path main body 10.

Not only the base portion 48 but also the upright portion 50 is embedded in the embedding portion 18 (the protector 17), and the upright portion 50 and the base portion 48 are continuous to each other at substantially right angles. Therefore, the bracket 47 and the protector 17 are more reliably formed into a single piece. Other configurations are the same as those in the above-described Embodiment 1, and therefore the same configurations are represented by the same reference signs as those used in Embodiment 1 and a description of their structures, functions, and effects is omitted.

Embodiment 9

Figure 16:
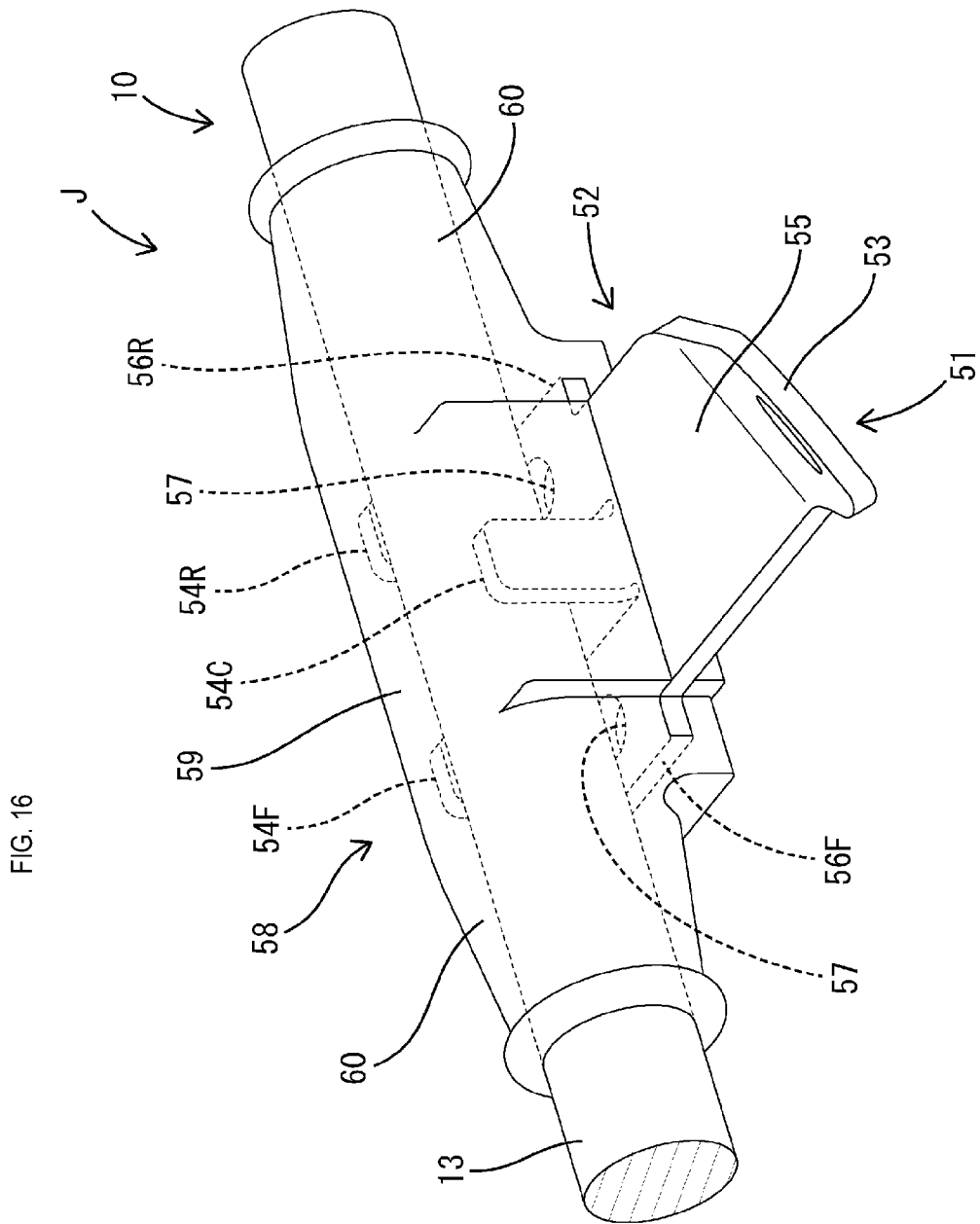
FIG. 16 is a perspective view of a bracket-equipped conductive path according to Embodiment 9.
Figure 17:
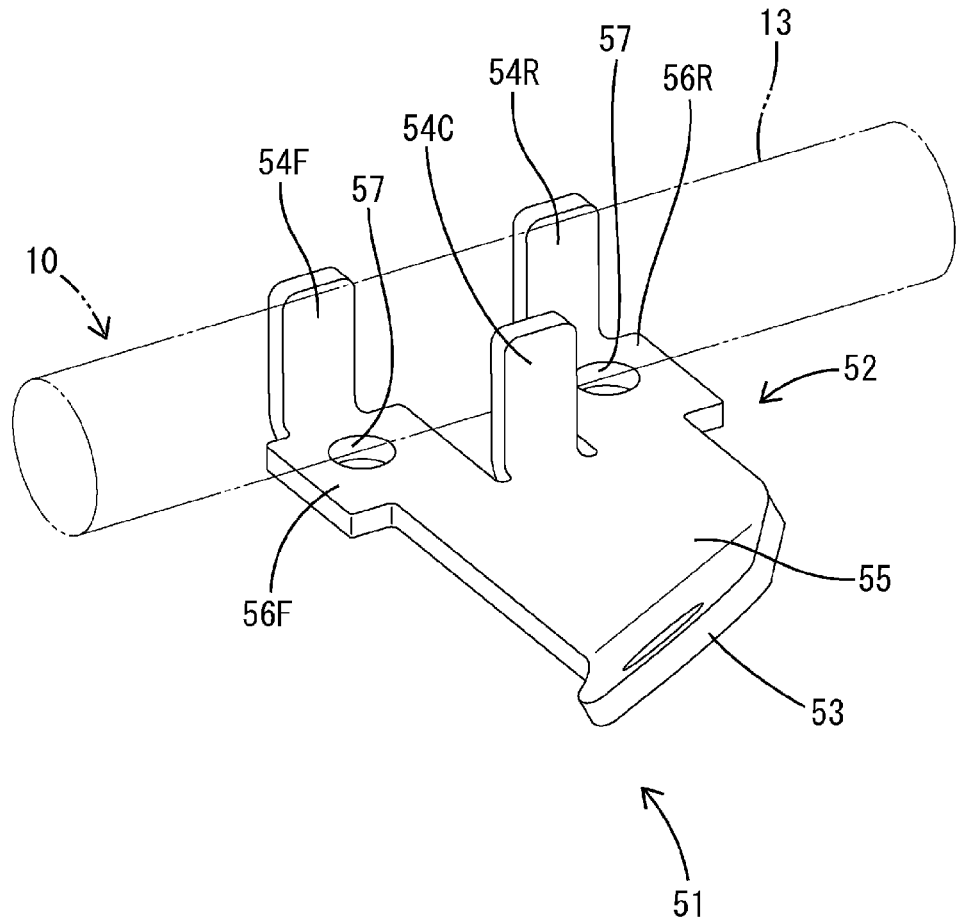
FIG. 17 is a perspective view showing a positional relationship between a conductive path main body and a bracket in Embodiment 9.
Figure 18:
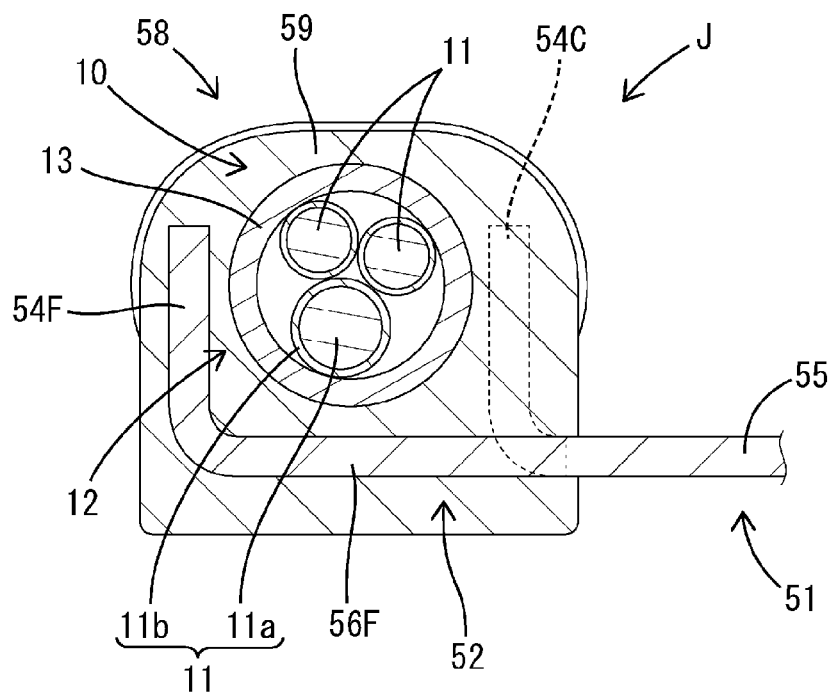
FIG. 18 is a cross-sectional view of the bracket-equipped conductive path according to Embodiment 9.
Figure 19:
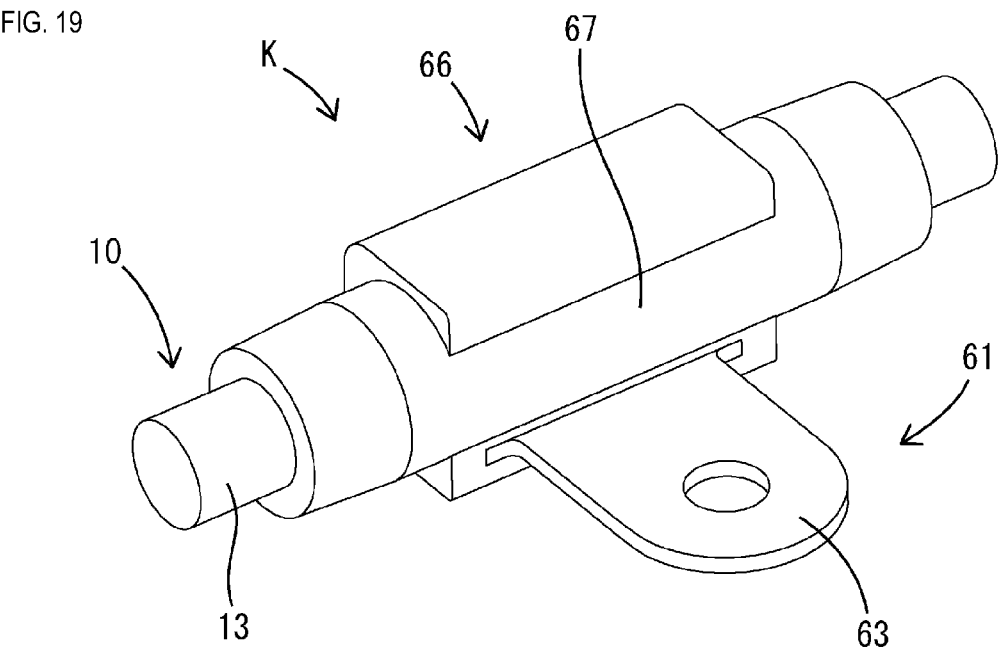
FIG. 19 is a perspective view of a bracket-equipped conductive path according to Embodiment 10.
Figure 20:
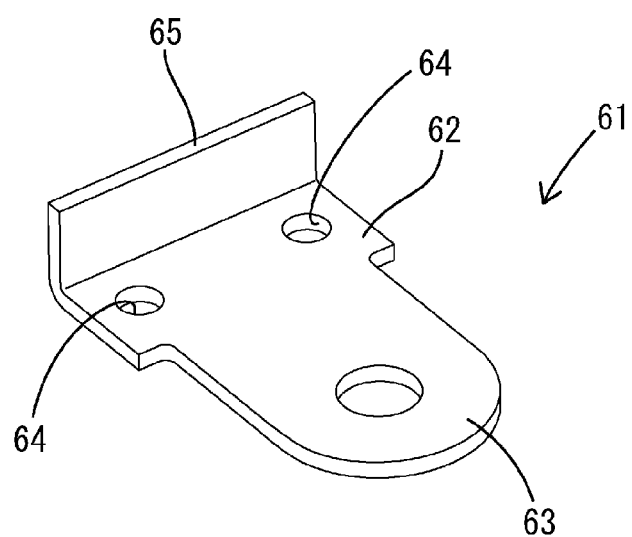
FIG. 20 is a perspective view of a bracket according to Embodiment 10.
Figure 21:
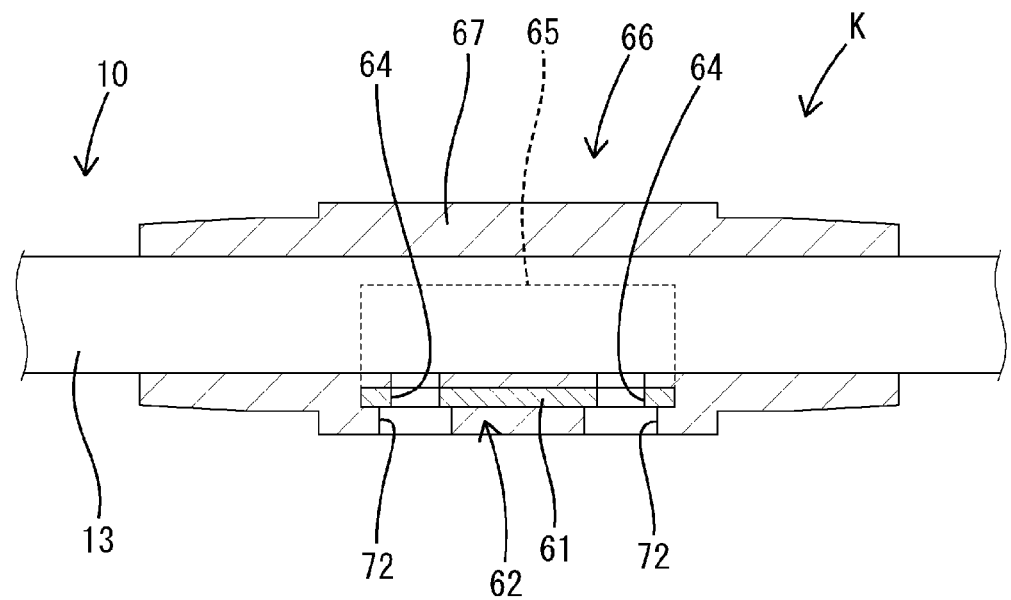
FIG. 21 is a cross-sectional side view of the bracket-equipped conductive path according to Embodiment 10.

Next, Embodiment 9 will be described as a specific embodiment of the present disclosure with reference to FIGS. 16 to 18. A bracket-equipped conductive path J according to Embodiment 9 includes a bracket 51 and a protector 58 ("a resin molded body" recited in the claims) that are configured differently from those of the above-described Embodiment 1. Other configurations are the same as those in the above-described Embodiment 1, and therefore the same configurations are represented by the same reference signs as those used in Embodiment 1 and a description of their structures, functions, and effects is omitted.

The bracket 51 of Embodiment 9 is made of a metal material and includes a flat plate-shaped base portion 52, an attachment portion 53 that extends from a right side edge of the base portion 52 in a cantilever manner, and first to third upright portions 54F, 54C, and 54R (each being "an upright portion" recited in the claims). The base portion 52 is constituted by one exposed portion 55 and a pair of front and rear embedded portions 56F and 56R. The exposed portion 55 has a substantially rectangular shape in plan view. The pair of front and rear embedded portions 56F and 56R extend from a left side edge portion of the exposed portion 55 to the left in a cantilever manner and are flush with the exposed portion 55. The pair of front and rear embedded portions 56F and 56R are arranged at intervals in the front-rear direction. A through hole 57 ("a cavity" recited in the claims) is formed in each of the embedded portions 56F and 56R, extending through the embedded portions 56F and 56R in the thickness direction.

The first upright portion 54F stands substantially perpendicularly upward from an extension edge of the front side embedded portion 56F. The second upright portion 54C stands substantially perpendicularly upward from a region between the front and rear embedded portions 56F and 56R on the left side edge of the exposed portion 55. The third upright portion 54R stands substantially perpendicularly upward from an extension edge of the rear side embedded portion 56R.

In a side view of the bracket 51, the first upright portion 54F, the second upright portion 54C, and the third upright portion 54R are arranged in this order in the axial direction (the front-rear direction) of the conductive path main body 10. In a rear view of the bracket 51, the first upright portion 54F and the third upright portion 54R overlap each other, and the second upright portion 54C is arranged at a position on the right of the first upright portion 54F and the third upright portion 54R.

In a plan view of the bracket 51, the first upright portion 54F, the second upright portion 54C, and the third upright portion 54R are arranged in a staggered manner. The distance between the second upright portion 54C and each of the first upright portion 54F and the third upright portion 54R is set to be larger than the outer diameter of the conductive path main body 10.

The protector 58 is constituted by a tubular embedding portion 59 and a pair of front and rear protective tube portions 60 that extend respectively from the front and rear ends of the embedding portion 59 in the axial direction of the conductive path main body 10. The entire regions of the embedded portions 56F and 56R of the base portion 52 and the entire regions of the first to third upright portions 54F, 54C, and 54R are embedded in the embedding portion 59.

The entire region of an upper surface of the base portion 52 (the embedded portions 56F and 56R) and the entire region of the outer circumferential surface of the conductive path main body 10 (the sheath 13) are positioned to not be in contact with each other. The entire regions of side surfaces of the first to third upright portions 54F, 54C, and 54R and the entire region of the outer circumferential surface of the conductive path main body 10 (the sheath 13) are also positioned to not be in contact with each other. A portion of the synthetic resin material of the protector 58 enters a space between the base portion 52 (the embedded portions 56F and 56R) and the outer circumferential surface of the conductive path main body 10 and spaces between the outer circumferential surface of the conductive path main body 10 and the first to third upright portions 54F, 54C, and 54R.

Embodiment 10

Next, Embodiment 10 will be described as a specific embodiment of the present disclosure with reference to FIGS. 19 to 23. A bracket-equipped conductive path K according to Embodiment 10 includes a bracket 61 and a protector 66 ("a resin molded body" recited in the claims) that are configured differently from those of the above-described Embodiment 1. Other configurations are the same as those in the above-described Embodiment 1, and therefore the same configurations are represented by the same reference signs as those used in Embodiment 1 and a description of their structures, functions, and effects is omitted.

The bracket 61 of Embodiment 10 is made of a metal material and includes a flat plate-shaped base portion 62, an attachment portion 63 that extends from a right side edge of the base portion 62 and is flush with the base portion 62, and an upright portion 65 that extends upward (substantially perpendicularly to the base portion 62) from a left edge of the base portion 62 in a cantilever manner. A pair of front and rear positioning holes 64 are formed in the base portion 62. The base portion 62 and the upright portion 65 are embedded in an embedding portion 67 of the protector 66.

The upright portion 65 faces a left side portion of the outer surface of the conductive path main body 10.

The entire region of an upper surface of the base portion 62 and the entire region of the outer circumferential surface of the conductive path main body 10 (the sheath 13) are positioned to not be in contact with each other. The entire region of a side surface of the upright portion 65 and the entire region of the outer circumferential surface of the conductive path main body 10 (the sheath 13) are also positioned to not be in contact with each other. A portion of the synthetic resin material of the protector 66 enters a space between the base portion 62 and the outer circumferential surface of the conductive path main body 10 and a space between the upright portion 65 and the outer circumferential surface of the conductive path main body 10.

Figure 22:
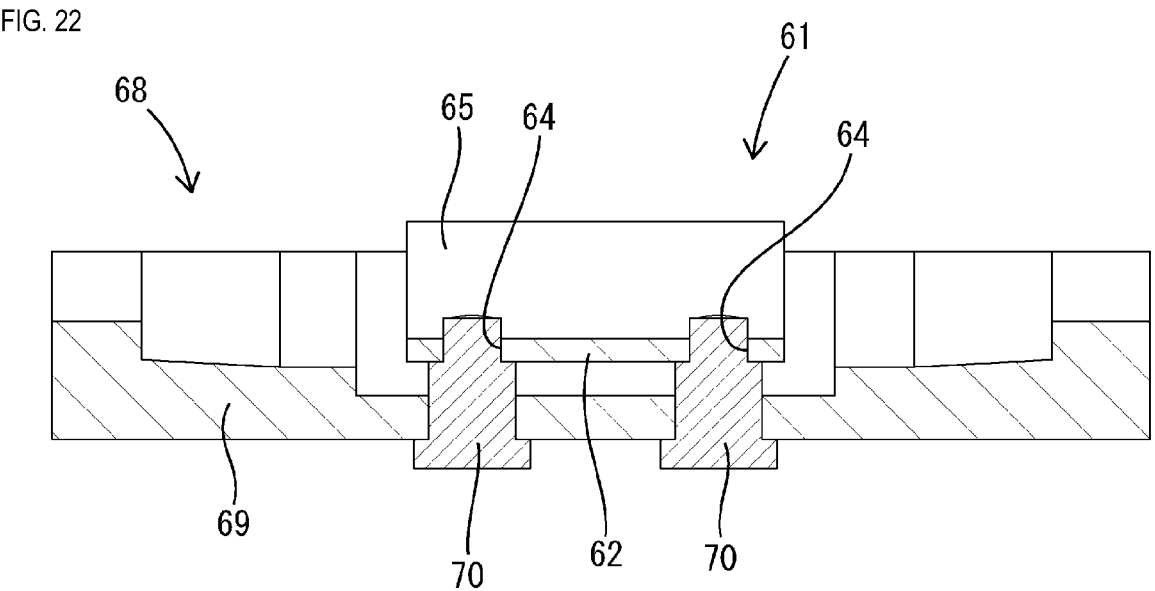
FIG. 22 is a cross-sectional side view showing a state in which the bracket is set in a lower mold in a manufacturing process of the bracket-equipped conductive path according to Embodiment 10.

As shown in FIG. 22, in production of the bracket-equipped conductive path K, the bracket 61 is set in a lower mold 69 that constitutes a mold 68. At this time, the base portion 62 of the bracket 61 is placed on upper end portions of a pair of front and rear support pins 70 that are provided in the lower mold 69, and the upper end portions of the support pins 70 are fitted to the positioning holes 64. In this state, a clearance is left between the lower mold 69 and a lower surface of the base portion 62.

Figure 23:
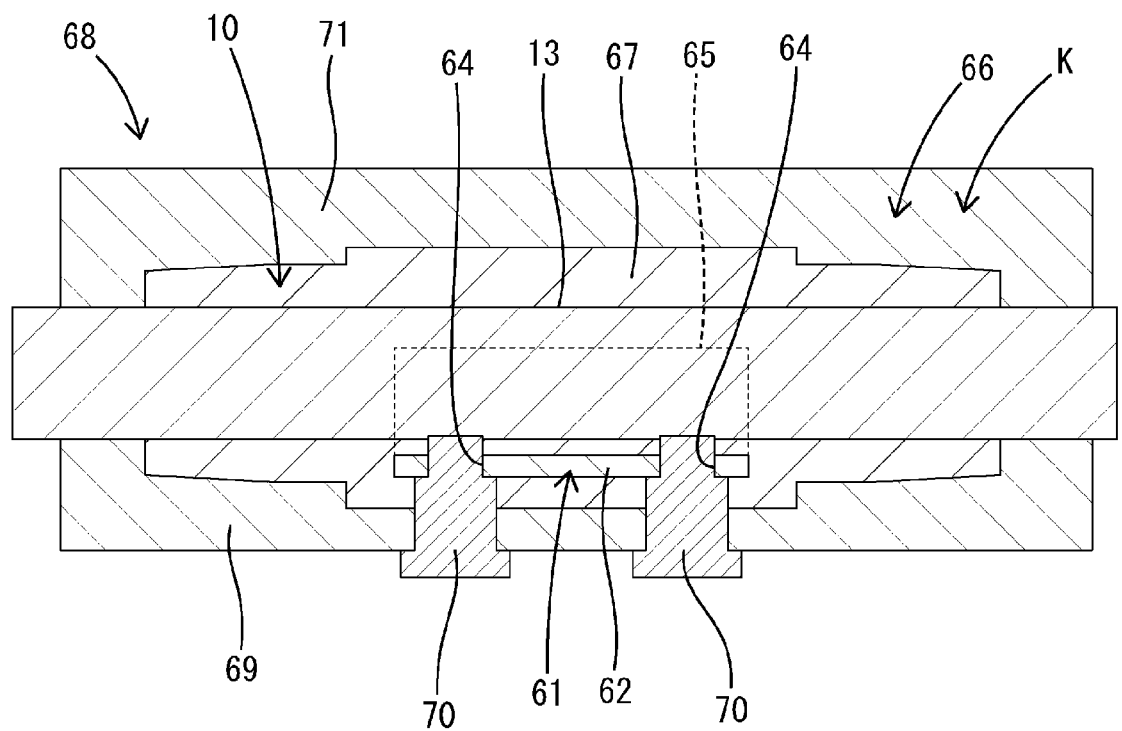
FIG. 23 is a cross-sectional side view showing a state in which molding of a resin molded body that is performed using a mold is completed in the manufacturing process of the bracket-equipped conductive path according to Embodiment 10.

After the bracket 61 is set in the lower mold 69, the lower mold 69 is covered with an upper mold 71 to close the mold 68 as shown in FIG. 23, and molten resin is injected into the mold 68. As a result of the injected synthetic resin solidifying, the protector 66 is molded. After the protector 66 has solidified, the mold is opened. When the mold is opened, the support pins 70 are removed from the positioning holes 64, and a pair of front and rear mold removal holes 72 are formed in a portion of the protector 66 located below the base portion 62.

Thus, the conductive path main body 10 and the base portion 62 of the bracket 61 are embedded in the protector 66, whereby the conductive path main body 10 and the bracket 61 are formed into a single piece and the production of the bracket-equipped conductive path K is completed.

Embodiment 11

Figure 24:
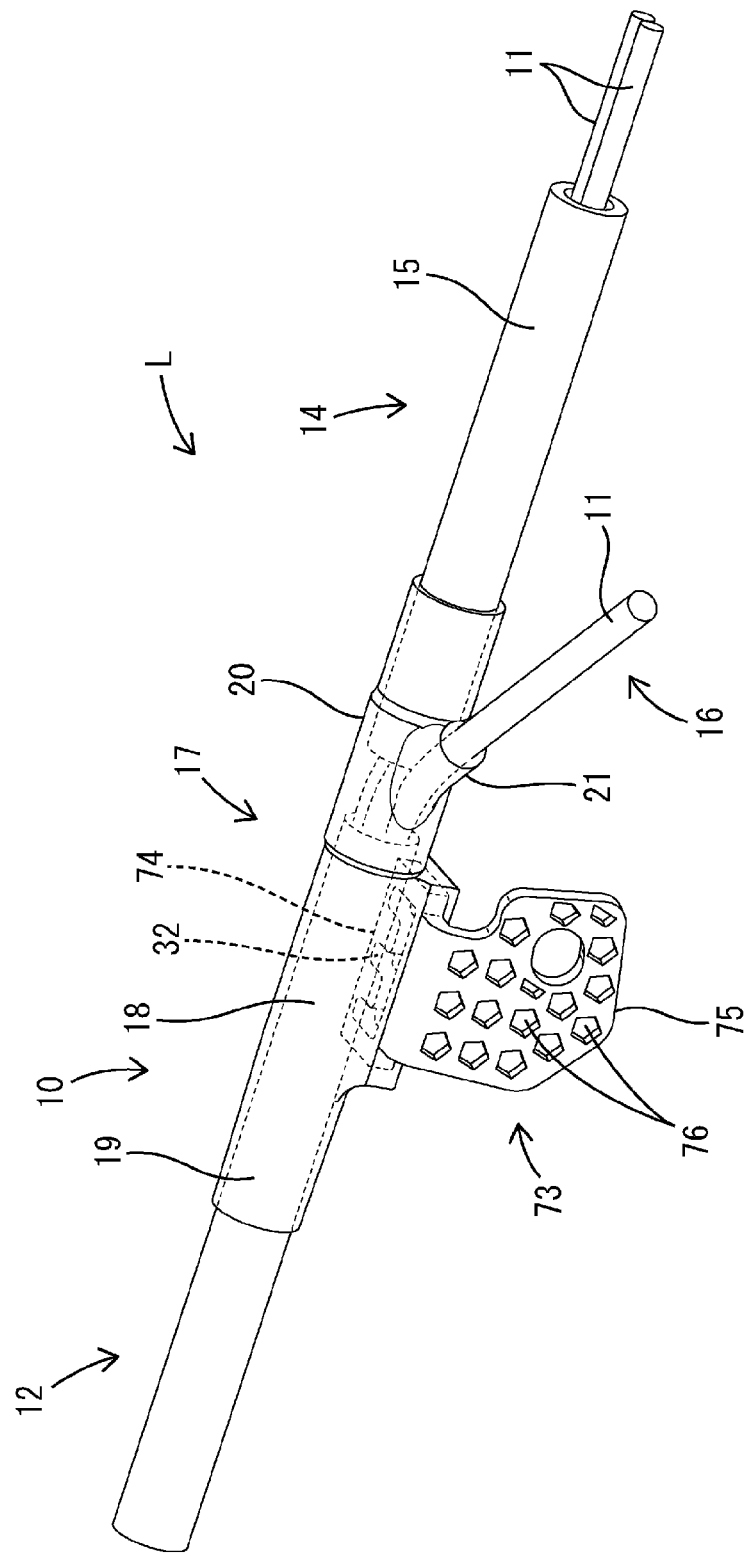
FIG. 24 is a perspective view of a bracket-equipped conductive path according to Embodiment 11.
Figure 25:
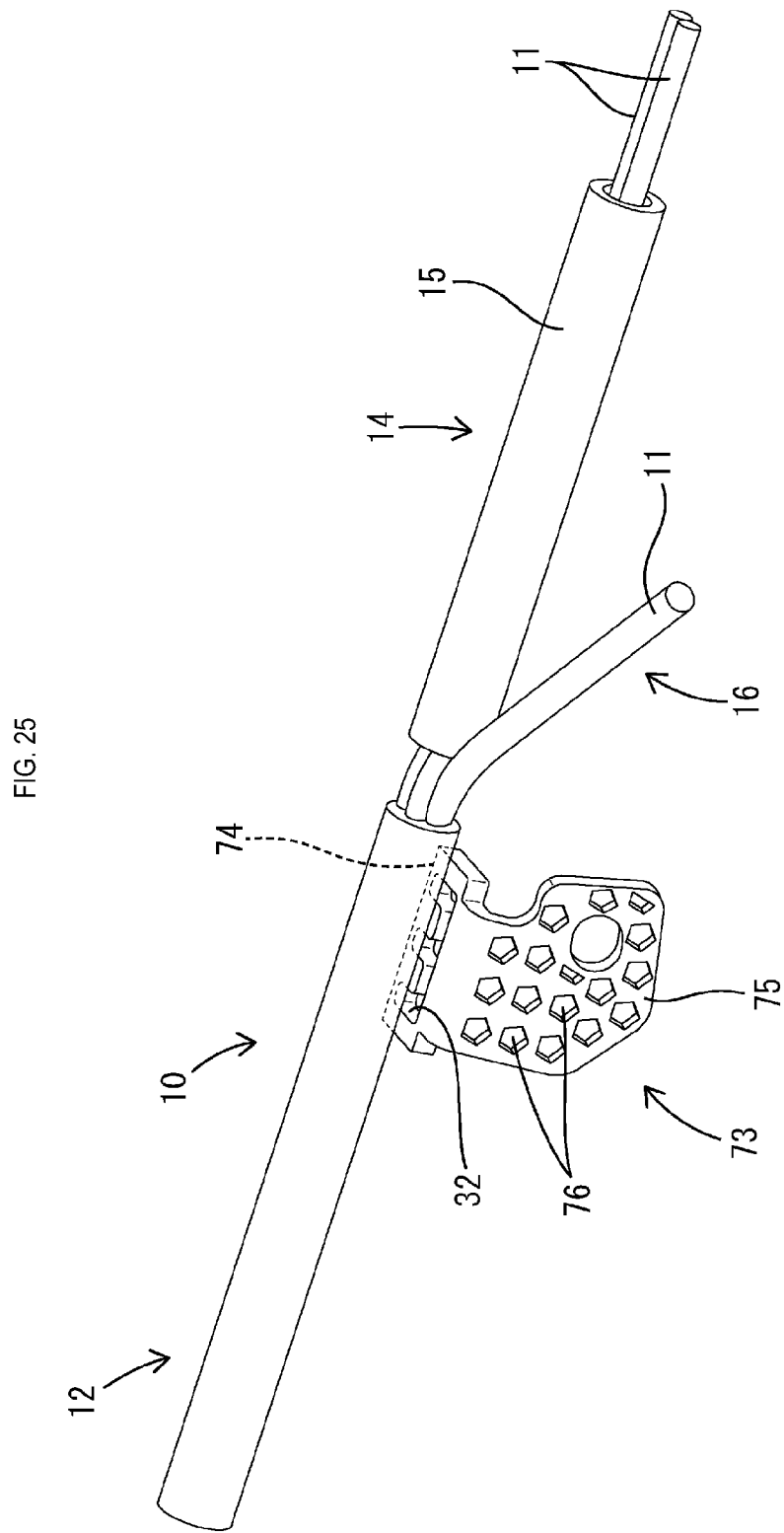
FIG. 25 is a perspective view showing a positional relationship between a conductive path main body and a bracket in Embodiment 11.

Next, Embodiment 11 will be described as a specific embodiment of the present disclosure with reference to FIGS. 24 and 25. A bracket-equipped conductive path L according to Embodiment 11 includes a bracket 73 that is configured differently from that of the above-described Embodiment 1. Other configurations are the same as those in the above-described Embodiment 1, and therefore the same configurations are represented by the same reference signs as those used in Embodiment 1 and a description of their structures, functions, and effects is omitted.

The bracket 73 of Embodiment 11 is made of a synthetic resin material to reduce the weight. The bracket 73 includes a base portion 74 that is embedded in the embedding portion 18 of the protector 17 and an attachment portion 75 that extends substantially perpendicularly to the base portion 74. A through hole 32 ("a cavity" recited in the claims) that has the same shape as that of Embodiment 4 is formed in the base portion 74. Also, a plurality of reinforcing portions 76 are formed in the attachment portion. The reinforcing portions 76 are formed by making recesses in a side surface of the attachment portion and have polygonal shapes or a honeycomb shape, for example. Owing to the formation of the plurality of reinforcing portions 76, the rigidity of the bracket 73, in particular, the attachment portion 75, is increased.

Embodiment 12

Figure 26:
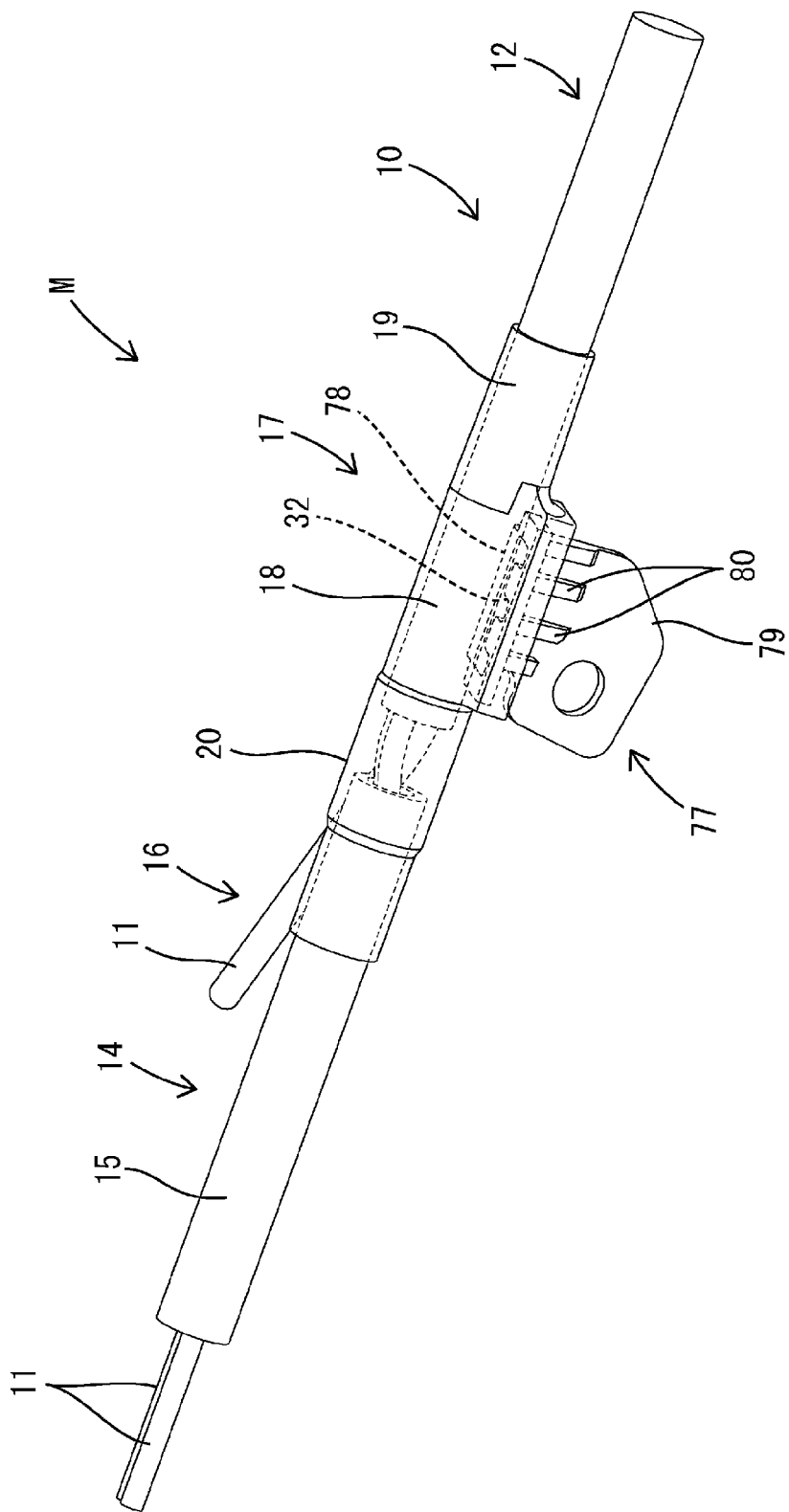
FIG. 26 is a perspective view of a bracket-equipped conductive path according to Embodiment 12.
Figure 27:
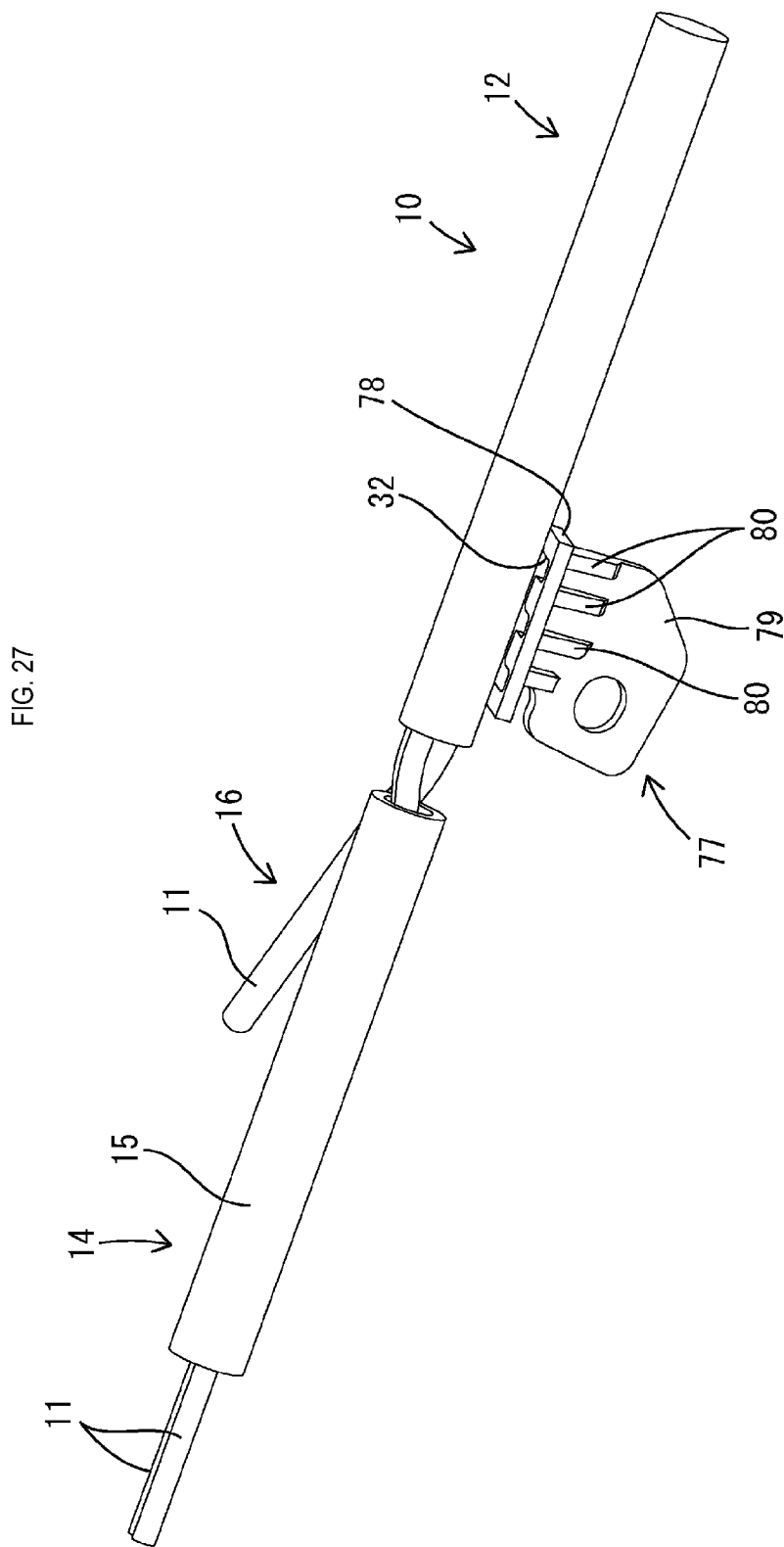
FIG. 27 is a perspective view showing a positional relationship between a conductive path main body and a bracket in Embodiment 12.

Next, Embodiment 12 will be described as a specific embodiment of the present disclosure with reference to FIGS. 26 and 27. A bracket-equipped conductive path M according to Embodiment 12 includes a bracket 77 that is configured differently from that of the above-described Embodiment 1. Other configurations are the same as those in the above-described Embodiment 1, and therefore the same configurations are represented by the same reference signs as those used in Embodiment 1 and a description of their structures, functions, and effects is omitted.

The bracket 77 of Embodiment 12 is made of a synthetic resin material to reduce the weight. The bracket 77 includes a base portion 78 that is embedded in the embedding portion 18 of the protector 17 and an attachment portion 79 that extends substantially perpendicularly to the base portion 78. A through hole 32 ("a cavity" recited in the claims) that has a shape obtained by reversing the left and right of the through hole 32 of Embodiment 4 is formed in the base portion. Also, a plurality of reinforcing portions 80 are formed in the attachment portion 79. The reinforcing portions 80 have the shape of ribs that project along a side surface of the attachment portion 79. Owing to the formation of the plurality of reinforcing portions 80, the rigidity of the bracket 77, in particular, the attachment portion 79, is increased.

OTHER EMBODIMENTS

The present disclosure is not limited to the embodiments described above with reference to the drawings and, for example, the following embodiments are also included in the technical scope of the present disclosure.

In the above-described Embodiments 1 to 12, the protector includes the protective tube portions that extend from the embedding portion, but a configuration is also possible in which the protector does not include protective tube portions.

In the above-described Embodiments 1 to 12, the protector includes a pair of protective tube portions that extend from the embedding portion toward two sides thereof, but a configuration is also possible in which the protector includes a single protective tube portion that extends from the embedding portion only toward one side thereof.

In the above-described Embodiments 1 to 12, the bracket is fixed in the vicinity of the branched portion of the conductive path main body, but a configuration is also possible in which the bracket is fixed to a portion where the entire conductive path main body is arranged while being curved, rather than the branched portion of the conductive path main body.

The configuration of the above-described Embodiment 2 in which the base portion is in contact with the outer circumferential surface of the conductive path main body can also be applied to Embodiments 3 to 12.

In the above-described Embodiments 3 to 6, the cavity extends through the base portion, but a configuration is also possible in which the cavity does not extend through the base portion.

The configuration of the above-described Embodiment 5 in which the groove portions are formed in the embedding portion can also be applied to Embodiments 1 to 3 and 6 to 8.

The configuration of the above-described Embodiment 7 in which the cushioning portion is formed between the attachment portion and the base portion can also be applied to Embodiments 1 to 6 and 8.

The configuration of the above-described Embodiments 8 to 10 in which the upright portion extends substantially perpendicularly from the base portion can also be applied to Embodiments 1 to 7, 11, and 12.

In the above-described Embodiments 11 and 12, the reinforcing portions are formed only in the attachment portion of the bracket, but a configuration is also possible in which reinforcing portions are formed in both the base portion and the attachment portion or only in the base portion.

The configuration of the above-described Embodiments 11 and 12 in which the reinforcing portions are formed in the bracket can also be applied to Embodiments 1 to 10.

In the above-described Embodiments 1 to 10, the bracket is made of metal, but the bracket may be made of a synthetic resin in Embodiments 1 to 10.

In the above-described Embodiments 11 and 12, the bracket is made of a synthetic resin, but the bracket may be made of metal in Embodiments 11 and 12.

The invention claimed is:

1. A bracket-equipped conductive path comprising:
   a conductive path main body that is constituted by a plurality of coated wires;
   a resin molded body that surrounds the conductive path main body; and
   a bracket that includes a base portion that is embedded in the resin molded body and an attachment portion that is continuous to the base portion, the base portion having a through hole, wherein the through hole is an elongated slot, a portion of the resin molded body completely filling the through hole so as to fixedly secure the base portion within the resin molded body;
   wherein the base portion has a substantially flat plate shape presenting a planar surface, the planar surface radial to and facing the conductive path main body in a direction that is substantially parallel to a thickness direction of the base portion so as to be spaced apart from the conductive path main body,
   wherein the entire region of the base portion and the entire region of the conductive path main body are not in contact with each other;
   the resin molded body is interposed between the base portion and the conductive path main body;
   wherein a protrusion protrudes from an outer edge portion of the base portion, the protrusion is continuous to the base portion and is flush with the base portion, the protrusion is embedded within the resin molded body; and
   wherein the resin molded body is made by insert molding with the base portion of the bracket inside so as to be a unitary piece.

2. The bracket-equipped conductive path according to claim 1, wherein an upright portion that stands to face an outer circumferential surface of the conductive path main body is formed on the base portion, the upright portion being orthogonal to the base portion and embedded within the resin molded body.

3. The bracket-equipped conductive path according to claim 1, wherein the resin molded body is made of a flexible material.

4. The bracket-equipped conductive path according to claim 1, wherein a reinforcing portion is formed in at least one of the base portion and the attachment portion, the reinforcing portion being a recess in a side surface of the attachment portion and having a polygonal shape or a honeycomb shape.

5. The bracket-equipped conductive path according to claim 1, wherein the conductive path main body is constituted by a trunk line in which the plurality of coated wires are collectively surrounded by a sheath and a plurality of branch lines from which the sheath is removed and that branch off from the trunk line, the resin molded body surrounds, in a liquid-tight manner, a branched region in which the plurality of branch lines branch off from the trunk line, and the base portion is embedded in the resin molded body in the vicinity of the branch lines.

6. The bracket-equipped conductive path according to claim 1, wherein the through hole includes a plurality of second slits spaced apart from each other and orthogonal and continuous to the elongated slot.

\* \* \* \* \*